(12) United States Patent
Shiraishi et al.

(10) Patent No.: US 6,452,709 B1
(45) Date of Patent: Sep. 17, 2002

(54) MULTI-BEAM EXPOSURE UNIT

(75) Inventors: Takashi Shiraishi, Sagamihara; Masao Yamaguchi, Funabashi; Yasuyuki Fukutome, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/685,858

(22) Filed: Oct. 11, 2000

Related U.S. Application Data

(62) Division of application No. 09/389,370, filed on Sep. 3, 1999, now Pat. No. 6,201,625, which is a division of application No. 09/041,723, filed on Mar. 13, 1998, now Pat. No. 6,055,084, which is a division of application No. 08/780,905, filed on Jan. 9, 1997, now Pat. No. 5,751,462.

(30) Foreign Application Priority Data

Jan. 11, 1996 (JP) ............................................. 8-002988

(51) Int. Cl.⁷ ............................................. G02B 26/08
(52) U.S. Cl. ........................ 359/205; 359/207; 359/216
(58) Field of Search ................................ 359/196–226; 347/258–261

(56) References Cited

U.S. PATENT DOCUMENTS

| | | | |
|---|---|---|---|
| 5,181,137 A | 1/1993 | Koide | 359/217 |
| 5,251,055 A | 10/1993 | Koide | 359/204 |
| 5,737,112 A * | 4/1998 | Iizuka | 359/205 |
| 5,751,462 A | 5/1998 | Shiraishi et al. | 359/204 |

FOREIGN PATENT DOCUMENTS

| | | |
|---|---|---|
| EP | 0 472 172 | 2/1992 |
| JP | 59-34512 | 2/1984 |
| JP | 59-198421 | 11/1984 |
| JP | 5-341217 | 12/1993 |
| JP | 5-142495 | 5/1994 |
| JP | 6-164847 | 6/1994 |
| JP | 6-222295 | 8/1994 |
| JP | 7-128604 | 5/1995 |

* cited by examiner

*Primary Examiner*—James Phan
(74) *Attorney, Agent, or Firm*—Foley & Lardner

(57) ABSTRACT

This invention has as its object to provide an image forming apparatus which can provide a color image free from any color misregistration with low cost, and a light scanning unit suitable for the apparatus. The apparatus includes a finite lens and a cylinder lens for giving predetermined characteristics to light beams emitted by a plurality of light sources, a laser synthesis mirror unit for synthesizing laser beams passing through the lenses, a deflection unit for deflecting the synthesized light beams, first and second image-forming lenses for adjusting the aberration characteristics, at the imaging position, of the deflected light beam, one or three mirrors for outputting the light beam passing through the image-forming lenses at predetermined positions, and can provide a color image free from any color misregistration.

8 Claims, 13 Drawing Sheets

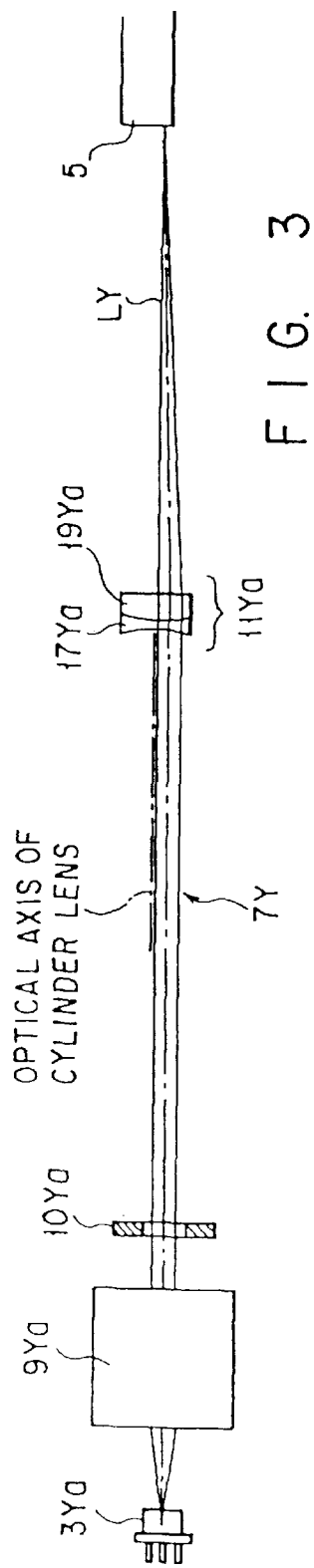
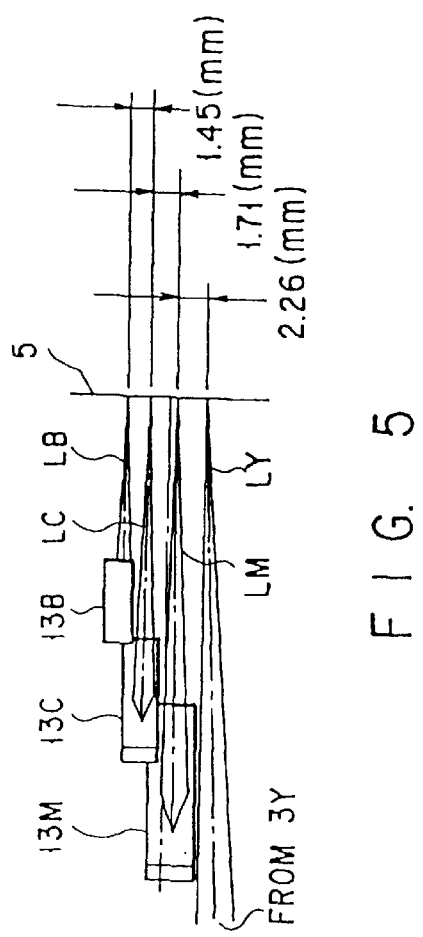
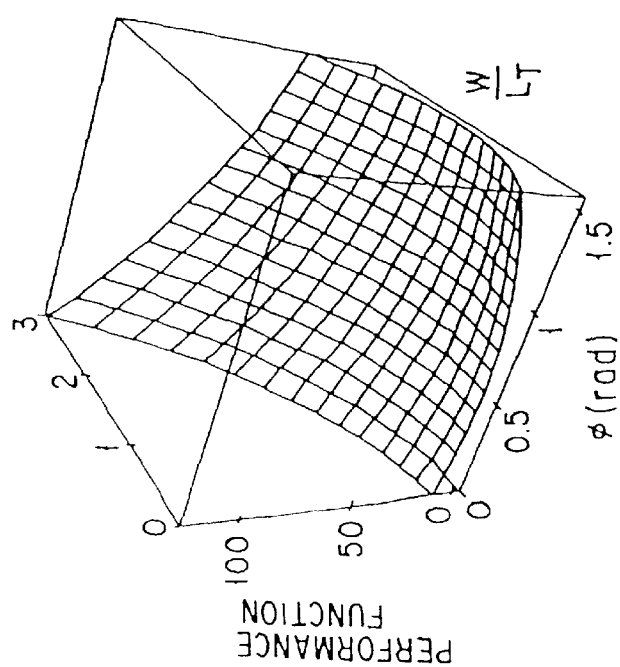
FIG. 3
FIG. 5
FIG. 4

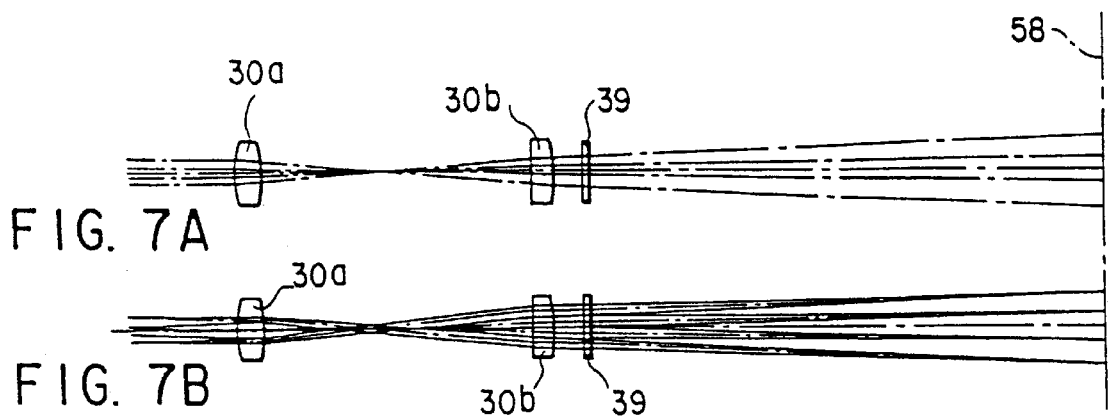
FIG. 7A
FIG. 7B
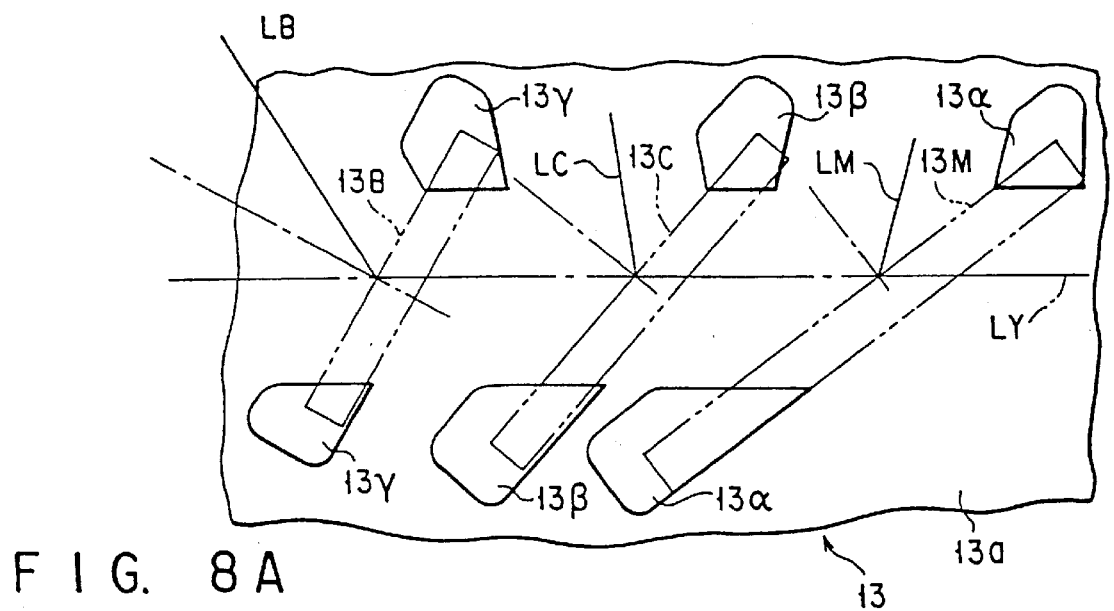
FIG. 8A
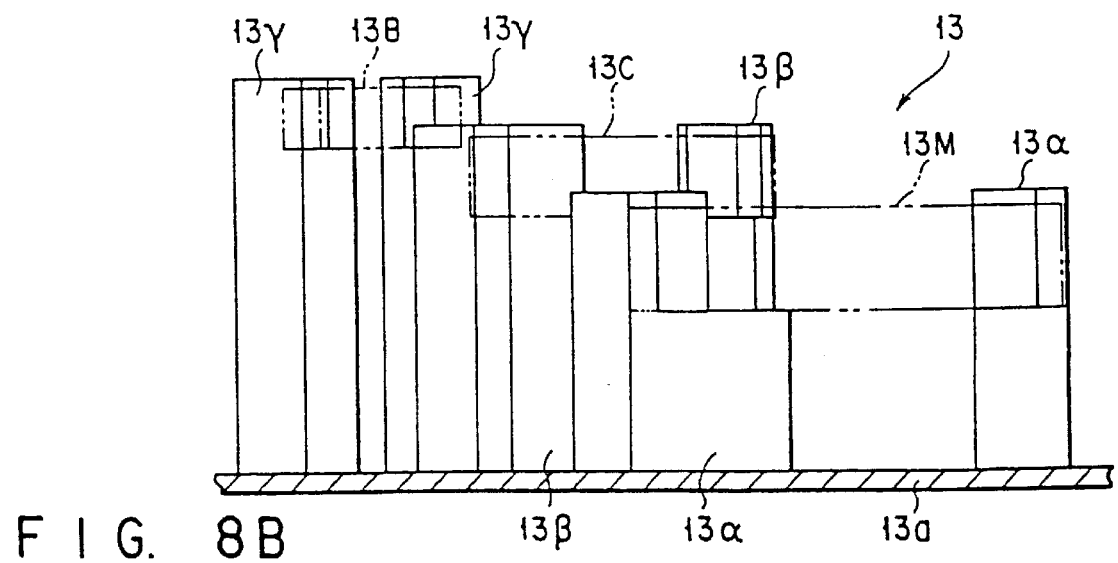
FIG. 8B

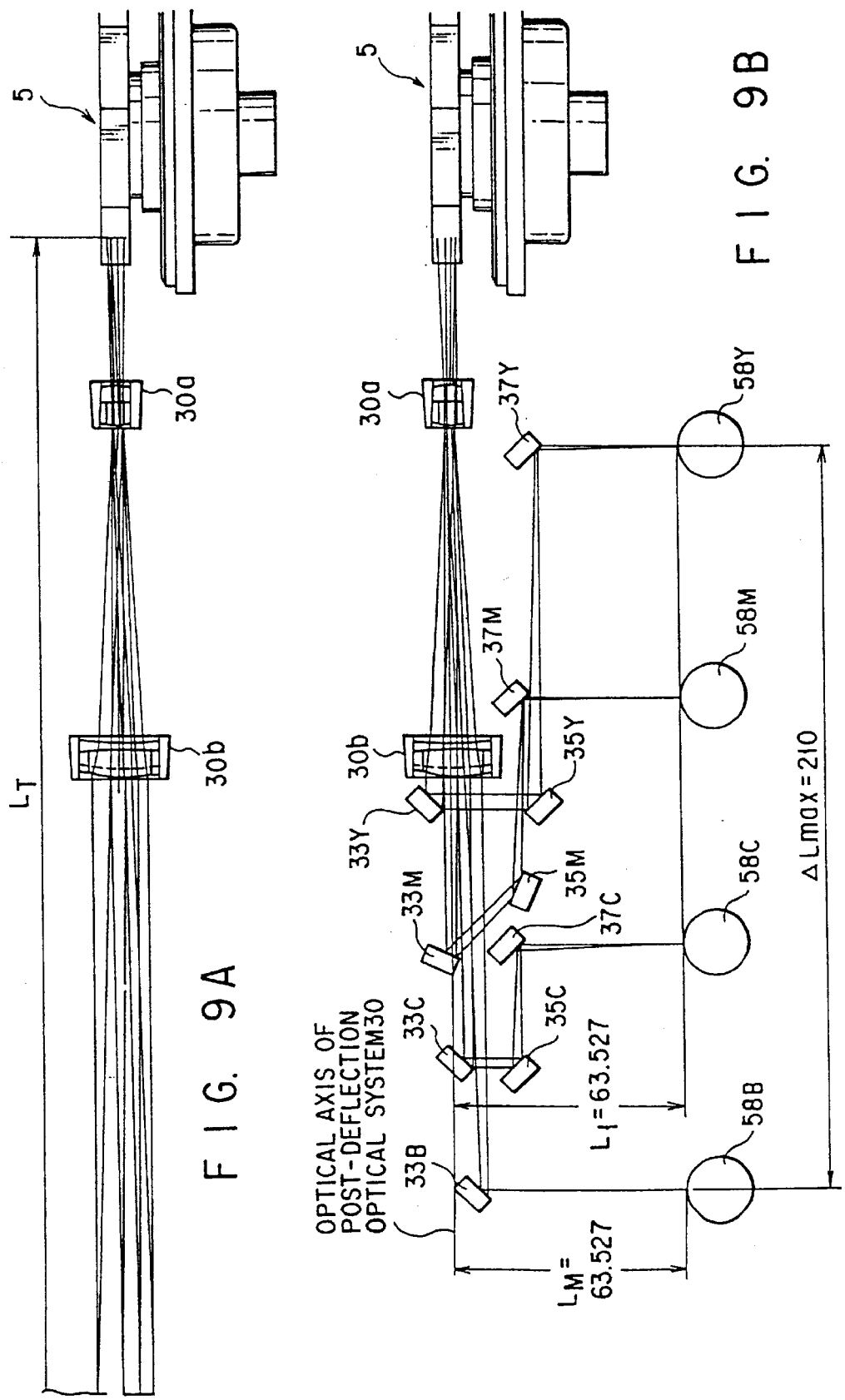

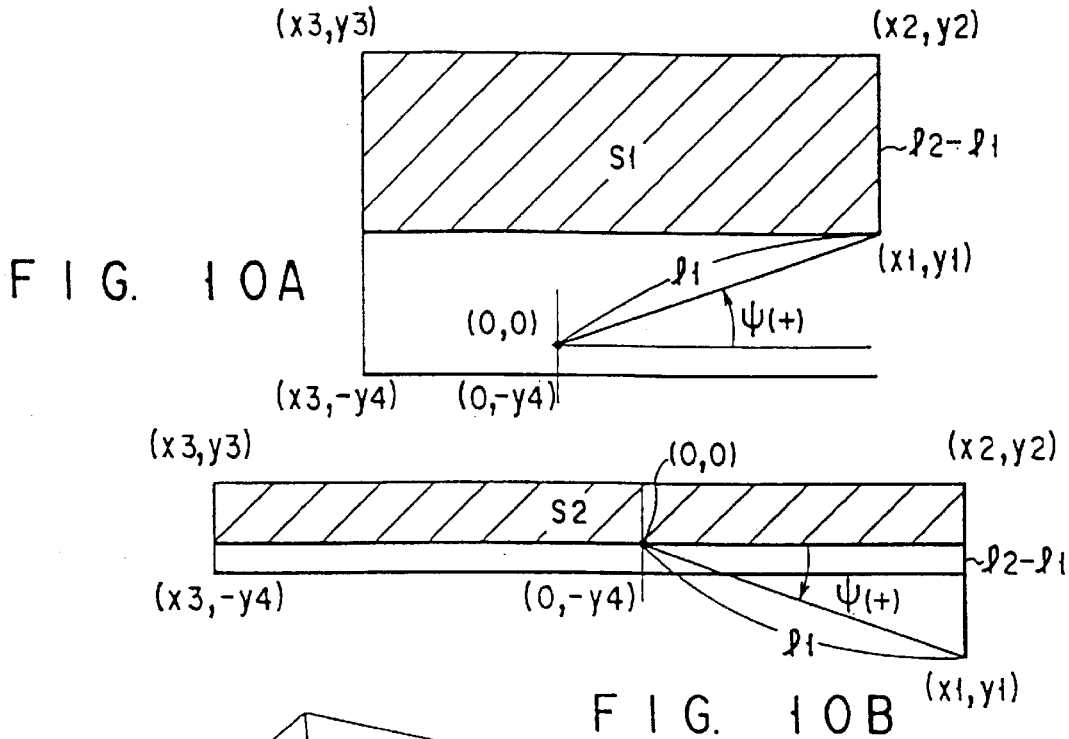
FIG. 10A
FIG. 10B
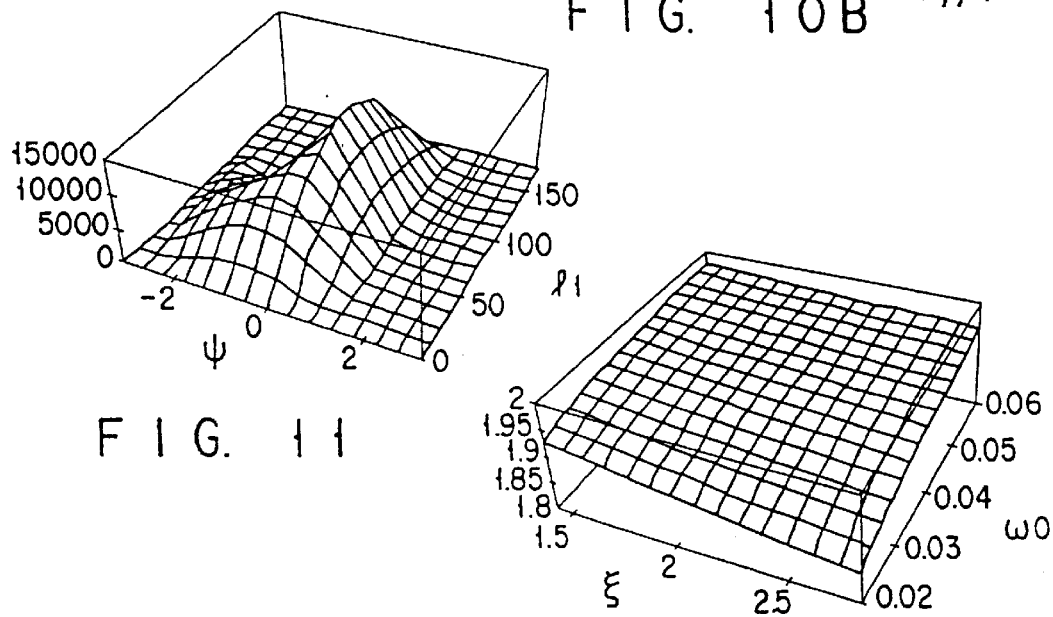
FIG. 11
FIG. 12
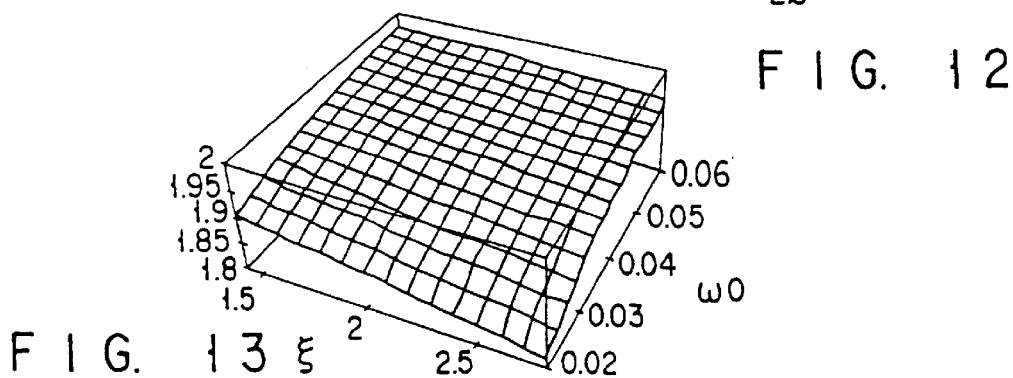
FIG. 13

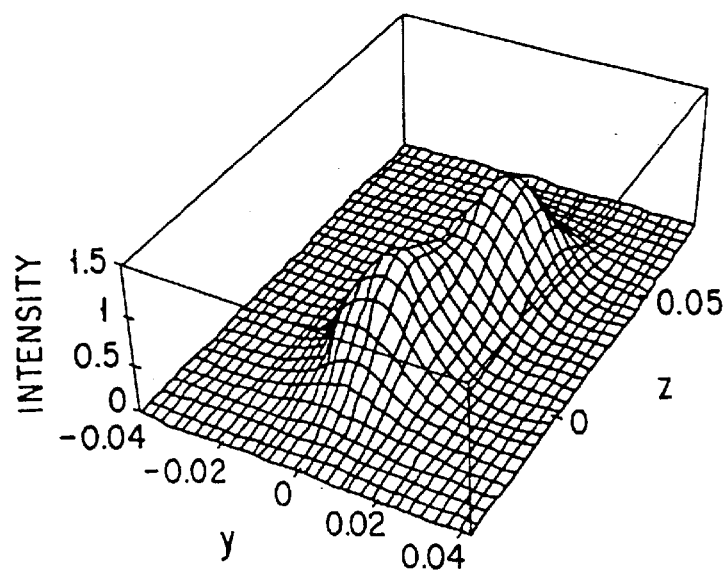
F I G. 18A
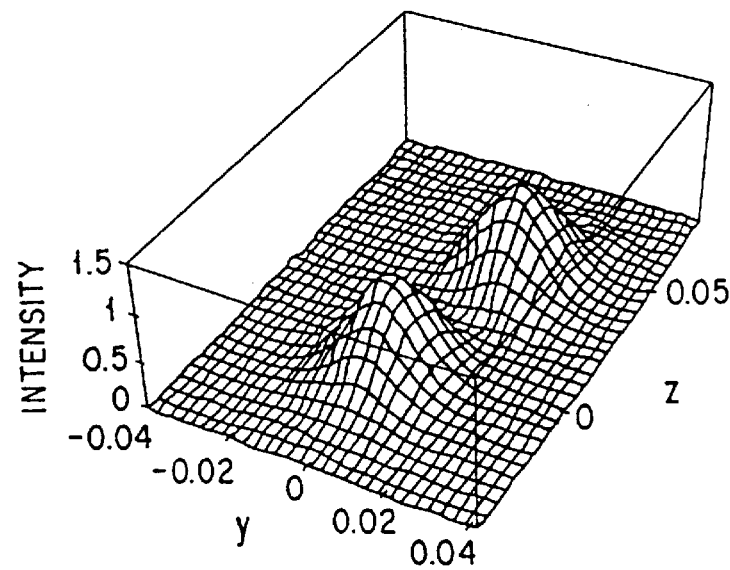
F I G. 18B

MULTI-BEAM EXPOSURE UNIT

This application is a divisional of application Ser. No. 09/389,370, filed Sep. 3, 1999, U.S. Pat. No. 6,201,625, which is a divisional of 09/041,723 filed Mar. 13, 1998, U.S. Pat. No. 6,055,084, which is in turn a divisional of 08/780,905 filed Jan. 9, 1997, U.S. Pat. No. 5,751,462.

BACKGROUND OF THE INVENTION

The present invention relates to a multi-beam laser exposure suitable for an image forming apparatus such as a color printer apparatus, a high speed copying machine and a color copying machine, each having a plurality of drums.

For example, an image forming apparatus such as a color printer, a color copying machine, or the like, each having a plurality of drums, uses a plurality of image forming units for forming images corresponding to color-separated color components, and a laser exposure unit for providing a plurality of image data, i.e., a plurality of laser beams in units of color components to these image forming units. As the laser exposure unit, for example, a plurality of laser exposure units are arranged, or a multi-beam laser exposure unit which can produce a plurality of laser beams is arranged.

The multi-beam laser exposure has a semiconductor laser element serving as a light source, a first lens group for focusing the beam size of a laser beam emitted by the laser element to a predetermined size, a light deflection unit for continuously reflecting the laser beam focused by the first lens group in a direction perpendicular to the feed direction of a recording medium, a second lens group for imaging the laser beam deflected by the light deflection unit at a predetermined position of the recording medium, and the like. In general, the direction in which the laser beam is deflected by the light deflection unit is called a main scanning direction, and the direction in which the recording medium is rotated, i.e., the direction perpendicular to the main scanning direction is called a sub-scanning direction.

As a light scanning unit of this type, for example, depending on the image forming apparatus to which the light scanning unit is applied, a plurality of light scanning units are arranged in correspondence with the image forming units or a multi-beam light scanning unit which can produce a plurality of laser beams is arranged.

If image information can be recorded on a recording medium using, e.g., N laser beams, the rotational speed of a rotary mirror and the image frequency can be reduced to 1/N.

By arranging M groups of light sources including N laser beams in correspondence with the number of color-separated color components, a compact light scanning unit suitable for an image forming apparatus that can form a color image can be provided.

However, in order to guide M groups of laser beams to the light deflection unit in a state wherein they can be considered as a single laser beam, the M groups of laser beams must be synthesized on the light source side of the light deflection unit. In this case, a sufficiently large distance must be assured between the light deflection unit and the light source, or the laser beams incident on the reflection surface of the light deflection unit must be incident to be separated from each other in the direction perpendicular to the rotation direction of the reflection surface, i.e., the sub-scanning direction.

When a large distance is assured between the light source and the light deflection unit, the light scanning unit becomes large in size. On the other hand, when the laser beams are incident on the reflection surface to be separated from each other in the sub-scanning direction, the imaging characteristics may deteriorate, or the bend amount differences in the scanning direction in units of M groups of laser beams, variations in sectional beam size on the image surface upon changes in refractive index of the lens material caused by environmental changes in units of M groups of laser beams, and the like may increase.

If the distance between the final lens surface and the image surface is increased for the purpose of attaining a size reduction of the light scanning unit, the bend amount differences in the scanning direction in units of M groups of laser beams increase. In this case, the bend amount can be reduced by increasing the distance between the reflection surface of the light deflection unit and the final lens surface, but the size of the light scanning unit increases. On the other hand, when the distance between the reflection surface and the final lens surface is increased, the driving frequency upon driving the laser element of each light source, i.e., the image frequency must be raised since the effective scanning angle decreases. As a consequence, cost increases in terms of noise measures and the frequency characteristics of the driving unit.

Furthermore, upon optimizing the lens passing positions of the M groups of laser beams separated in the sub-scanning direction to obtain uniform optical characteristics to be given to these laser beams, the laser beams that pass through positions offset in the sub-scanning direction from the optical axis of the system of the light scanning unit may suffer coma different from that for the remaining laser beams.

When each of the M groups of laser beams includes N laser beams, a plurality of half mirrors as semi-transparent mirrors are used to synthesize the N laser beams so that they are substantially considered as a single laser beam. In this case, when the laser beams pass through different numbers of half mirrors, the light amount difference, spherical aberration. difference, coma difference, and the like among the laser beams increase, resulting in different beam sizes.

Furthermore, when each of the M groups of laser beams includes N laser beams, since each group of laser beams has a width in the sub-scanning direction, the tilt, in the main scanning direction, between the exposure start and end positions of laser beams scanned in a single scan may increase up to a visible level.

Moreover, since each of the M groups of laser beams includes N laser beams, the optical energy on the image surface may vary due to the phase difference or wavelength variations of the laser beams when the light intensities of all the laser beams that have reached the image surface are synthesized. When variations in optical energy due to the phase difference or wavelength variations have exceeded a predetermined amount, the image may be locally lost or toner supply to an unexposed portion may be lost when such unit is built in the image forming apparatus.

BRIEF SUMMARY OF THE INVENTION

It is an object of the present invention to provide a light scanning unit that can form a color image suffering less color misregistration.

According to a first aspect of the present invention, there is provided an optical exposure unit comprising: light sources which are arranged in correspondence with numbers indicated by $N_1$ to $N_M$ (M is an integer not less than 1) and emit light beams; first lens means for converting the light beams emitted by each of the light sources into one of convergent light and collimated light, the lens means including one of a finite lens and collimate lens in number corresponding to a sum of $N_1$ to $N_M$; second lens means given lens power associated with a first direction to converge the light beams output from each of the lens means in only the first direction, the M sets of the second lens means being prepared; deflection means for deflecting the light beams output from the second lens means in a second direction perpendicular to the first direction, the deflection means including a reflection surface which is formed to be rotatable about a rotation axis extending in a direction parallel to the first direction as a center of rotation; and imaging means including at least one lens, and imaging each of the light beams deflected at an equal speed by the deflection means at a predetermined position, and wherein M beam groups are incident on the reflection surface of the deflection means so that an interval between adjacent beam groups monotonously increases from one end, and a beam group on one end with a smallest interval between adjacent beam groups is incident to cross the beams deflected by the deflection means.

According to the second aspect of the present invention, there is provided an optical exposure unit comprising: light sources which are arranged in correspondence with numbers indicated by $N_1$ to $N_M$ (M is an integer not less than 1) and emit light beams; first lens means for converting the light beams emitted by each of the light sources into one of convergent light and collimated light, the lens means including one of a finite lens and collimate lens in number corresponding to a sum of $N_1$ to $N_M$; second lens means given lens power associated with a first direction to converge the light beams output from each of the lens means in only the first direction, the M sets of the second lens means being prepared; deflection means for deflecting the light beams output from the second lens means in a second direction perpendicular to the first direction, the deflection means including a reflection surface which is formed to be rotatable about a rotation axis extending in a direction parallel to the first direction as a center of rotation; and imaging means including at least one lens, and imaging each of the light beams deflected at an equal speed by the deflection means at a predetermined position, and wherein a distance $L_0$ between a final lens surface and an image surface in a light scanning unit for irradiating M beam groups onto M image carriers falls within a range defined by:

$$(\Delta L_{MAX} + L_M + L_1)/1.8 > L_0$$

$$L_0 > (\Delta L_{MAX} + L_M + L_1)/2$$

where $L_1$ is the distance between an optical axis of a system of second optical means and a scanning line on one end, $L_M$ is the distance between the optical axis of the system of the second optical means and a scanning line on the other end, and $\Delta L_{MAX}$ is the distance, in a direction parallel to the optical axis of the system, between the scanning lines at the two ends.

According to the third aspect of the present invention, there is provided an optical exposure unit comprising: light sources which are arranged in correspondence with numbers indicated by $N_1$ to $N_M$ (M is an integer not less than 1) and emit light beams; first lens means for converting the light beams emitted by each of the light sources into one of convergent light and collimated light, the lens means including one of a finite lens and collimate lens in number corresponding to a sum of $N_1$ to $N_M$; second lens means given lens power associated with a first direction to converge the light beams output from each of the lens means in only the first direction, the M sets of the second lens means being prepared; deflection means for deflecting the light beams output from the second lens means in a second direction perpendicular to the first direction, the deflection means including a reflection surface which is formed to be rotatable about a rotation axis extending in a direction parallel to the first direction as a center of rotation; and imaging means including at least one lens, and imaging each of the light beams deflected at an equal speed by the deflection means at a predetermined position, and wherein an effective field angle ϕ of a beam deflected by the deflection means satisfies:

ϕ>W/$L_t$ where $L_t$ is the distance between a reflection point on the deflection means and an image surface, and W is the effective image region width including a region where a horizontal synchronization signal is detected.

According to the fourth aspect of the present invention, there is provided an optical exposure unit comprising: light sources which are arranged in correspondence with numbers indicated by $N_1$ to $N_M$ (M is an integer not less than 1) and emit light beams; first lens means for converting the light beams emitted by each of the light sources into one of convergent light and collimated light, the lens means including one of a finite lens and collimate lens in number corresponding to a sum of $N_1$ to $N_M$; second lens means given lens power associated with a first direction to converge the light beams output from each of the lens means in only the first direction, the M sets of the second lens means being prepared; deflection means for deflecting the light beams output from the second lens means in a second direction perpendicular to the first direction, the deflection means including a reflection surface which is formed to be rotatable about a rotation axis extending in a direction parallel to the first direction as a center of rotation; and imaging means including at least one lens, and imaging each of the light beams deflected at an equal speed by the deflection means at a predetermined position, and wherein an incident angle of a beam to M sets of optical members given positive power in only a sub-scanning direction has a predetermined tilt, and a position of the beam is decentered from an optical axis of each of the optical members.

According to the fifth aspect of the present invention, there is provided an optical exposure unit comprising: light sources which are arranged in correspondence with numbers indicated by $N_1$ to $N_M$ (M is an integer not less than 1) and emit light beams; first lens means for converting the light beams emitted by each of the light sources into one of convergent light and collimated light, the lens means including one of a finite lens and collimate lens in number corresponding to a sum of $N_1$ to $N_M$; second lens means given lens power associated with a first direction to converge the light beams output from each of the lens means in only the first direction, the M sets of the second lens means being prepared; deflection means for deflecting the light beams output from the second lens means in a second direction perpendicular to the first direction, the deflection means including a reflection surface which is formed to be rotatable about a rotation axis extending in a direction parallel to the first direction as a center of rotation; and second optical means including a lens having a function of imaging $N_i$ beams deflected by the deflection means to be scanned on a predetermined image surface at an equal speed, and correcting a surface inclination of the deflection means, wherein a scanning line is tilted from a direction perpendicular to a traveling direction of an image carrier by an angle:

$$\delta = \tan^{-1}(N_i \times p \times k \times \phi / (4 \times \pi \times W))$$

where p is the scanning pitch in a sub-scanning direction, and k is the number of rotary polygonal mirror surfaces.

According to the sixth aspect of the present invention, there is provided an optical exposure unit comprising: light sources which are arranged in correspondence with numbers indicated by $N_1$ to $N_M$ (M is an integer not less than 1) and emit light beams; first lens means for converting the light beams emitted by each of the light sources into one of convergent light and collimated light, the lens means including one of a finite lens and collimate lens in number corresponding to a sum of $N_1$ to $N_M$; second lens means given lens power associated with a first direction to converge the light beams output from each of the lens means in only the first direction, the M sets of the second lens means being prepared; deflection means for deflecting the light beams output from the second lens means in a second direction perpendicular to the first direction, the deflection means including a reflection surface which is formed to be rotatable about a rotation axis extending in a direction parallel to the first direction as a center of rotation; and second optical means including a lens having a function of imaging $N_i$ beams deflected by the deflection means to be scanned on a predetermined image surface at an equal speed, and correcting a surface inclination of the deflection means, wherein the unit satisfies:

$$\eta < e^{-\frac{2}{\alpha^2}} - \frac{\sqrt{2\pi}}{8}\alpha\zeta$$

where p is the beam pitch in a sub-scanning direction, $\beta$ is the $e^{-2}$ diameter, in a main scanning direction, of a beam/p, $\alpha$ is the $e^{-2}$ diameter, in the sub-scanning direction, of the beam/p, $\zeta$ is the half exposure amount of a photosensitive body/average exposure energy, and $\eta$ is the intensity of one beam relative to the peak intensity of the other beam at the middle point of a line connecting centers of two neighboring beams.

According to the seventh aspect of the present invention, there is provided an optical exposure unit comprising: light sources which are arranged in correspondence with numbers indicated by $N_1$ to $N_M$ (M is an integer not less than 1) and emit light beams; first lens means for converting the light beams emitted by each of the light sources into one of convergent light and collimated light, the lens means including one of a finite lens and collimate lens in number corresponding to a sum of $N_1$ to $N_M$; second lens means given lens power associated with a first direction to converge the light beams output from each of the lens means in only the first direction, the M sets of the second lens means being prepared; deflection means for deflecting the light beams output from the second lens means in a second direction perpendicular to the first direction, the deflection means including a reflection surface which is formed to be rotatable about a rotation axis extending in a direction parallel to the first direction as a center of rotation; and imaging means including at least one lens, and imaging each of the light beams deflected at an equal speed by the deflection means at a predetermined position, and wherein M sets of optical members given positive power in only a sub-scanning direction includes a one-sided cylinder lens consisting of glass, and a double-sided cylinder lens substantially equivalent to a material of a post-deflection optical system lens.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a partial sectional view of a pre-deflection optical system of the light scanning unit shown in FIG. 2 taken along the optical axis of the system between a first light source and a light deflection unit;

FIG. 4 is a diagram showing the relationship among the effective image-angle of the beam, the width of the effective image region, the distance between the reflection point and the image surface and the optical performance of the apparatus;

FIG. 5 is a partial sectional view, in the sub-scanning direction, of the light scanning unit in FIG. 2 to show the states of first to fourth laser beams propagating toward the light deflection unit;

FIGS. 7A and 7B are schematic plan views showing the layout states of the optical members of the pre-deflection optical system of the light scanning unit shown in FIG. 2;

FIGS. 8A and 8B are respectively a plan view and a side view illustrating a laser synthesis mirror unit of the light scanning unit shown in FIG. 2;

FIGS. 9A and 9B are schematic views depicting the region where photosensitive drums built in the image forming apparatus can be arranged when the light scanning unit shown in FIG. 2 is used;

FIGS. 10A and 10B are schematic views showing the method of defining the mountable region of the process-related members used in the scanning unit shown in FIG. 2;

FIG. 11 is a graph obtained by plotting the area which the smaller of the regions $S_1$ and $S_2$, both shown in FIG. 10, has when $\zeta=1.4$, $L_2=175$, $\lambda=0.00068$ and $\omega_0=0.025$;

FIG. 12 is a graph obtained by plotting the value which the equation (a-14) yields when $\lambda=0.00063$;

FIG. 13 is a graph obtained by plotting the value which the equation (a-14) yields when $\lambda=0.0008$ regarded as a practical value;

FIGS. 18A and 18B are graphs for explaining the relationship between the phase difference and the intensity distribution of laser beams irradiated onto the photosensitive drum;

DETAILED DESCRIPTION OF THE INVENTION

The preferred embodiment of the present invention will be described hereinafter with reference to the accompanying drawings.

Figure 1:
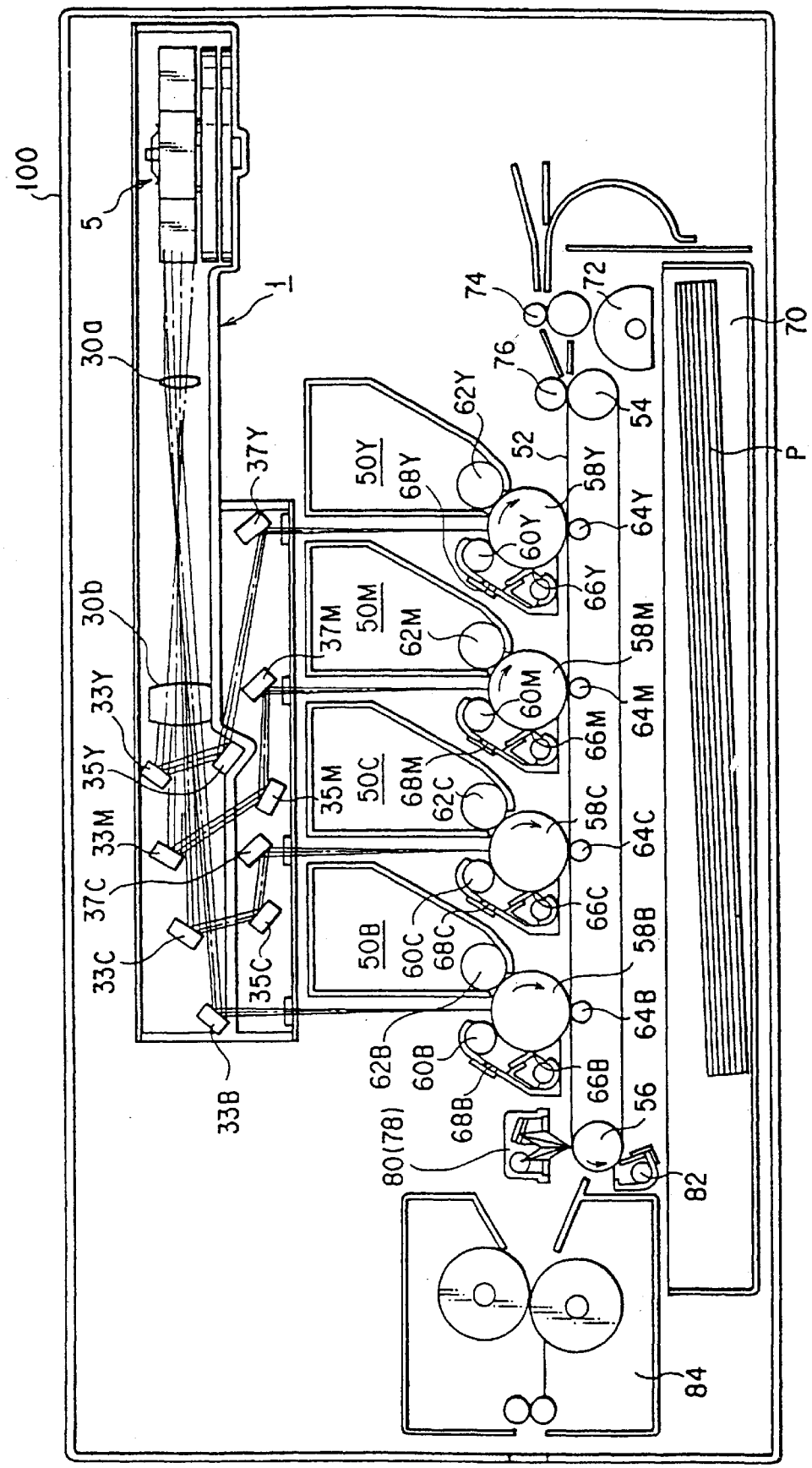
FIG. 1 is a schematic sectional view of an image forming apparatus which uses a multi-beam laser exposure according to an embodiment of the present invention.

FIG. 1 is a front sectional view of a four-drum type color image forming apparatus. Since a multi-color laser beam printer apparatus uses four different image data color-separated in units of color components of Yellow=Y, Magenta=M, Cyan=C, and Black=B, and four sets of various units for forming images in units of color components in correspondence with Y, M, C, and B, the image data in units of color components and the corresponding units are identified by appending Y. M, C, and B to corresponding reference numerals.

An image forming apparatus 100 has first to fourth image forming units 50Y, 50M, 50C, and 50B for forming images in units of color-separated color components, i.e., Y=yellow, M=magenta, C=cyan, and B=black.

The respective image forming units 50(Y, M, C, and B) are serially arranged underneath a light scanning unit 1 in the order of 50Y, 50M, 50C, and 50B in correspondence with the exit positions of laser beams L(Y, M, C, and B) corresponding to the respective color component images via third mirrors 37Y, 37M, and 37C, and a first mirror 33B of the light scanning unit 1.

A conveyor belt 52 for conveying images formed by the image forming units 50(Y, M, C, and B) is arranged below the image forming units 50(Y, M, C, and B).

The conveyor belt 52 is looped between a belt driving roller 56 rotated in the direction of an arrow by a motor (not shown) and a tension roller 54, and is rotated in the rotation direction of the belt driving roller 56 at a predetermined speed.

The image forming units 50(Y, M, C, and B) respectively have photosensitive bodies 58Y, 58M, 58C, and 58B, each of which has a cylindrical drum shape and is rotatable in the direction of an arrow, and on each of which an electrostatic latent image corresponding to an image is formed:

Around the photosensitive bodies 58(Y, M,. C, and B), chargers 60Y, 60M, 60C, and 60B for giving predetermined potentials to the surfaces of the photosensitive bodies 58(Y, M, C, and B); developing units 62Y, 62M, 62C, and 62B for developing an electrostatic latent image formed on the surface of each of the photosensitive bodies with corresponding color toners; transfer units 64Y, 64M, 64C, and 64B which oppose the photosensitive bodies while the conveyor belt 52 is inserted between each of the photosensitive bodies and themselves, and transfer toner images on the photosensitive bodies onto the conveyor belt 52 or a recording medium conveyed via the conveyor belt 52; cleaners 66Y, 66M, 66C, and 66B for removing the residual toners on the photosensitive bodies after the transfer units 64(Y, M, C, and B) transfer the toner images; and charge removers (charge removing lamps) 68Y, 68M, 68C, and 68B for removing the residual potentials on the photosensitive bodies 58 after the transfer units 64(Y, M, C, and B) transfer the toner images, are arranged in turn along the rotation direction of each of the photosensitive bodies.

Note that each of laser beams LY, LM, LC, and LB guided to the photosensitive bodies (drums) 58 by the mirrors 37Y, 37M, 37C, and 33B of the light scanning unit 1 is split into $N_i$ beams in the sub-scanning direction above the corresponding photosensitive body, and the $N_i$ beams are irradiated between the chargers 60(Y, M, C, and B) and the developing units 62(Y, M, C, and B), as will be described later with reference to FIGS. 2 to 6. In this example, each of the laser beams LY, LM, and LC is split into two beams ($N_1=N_2=N_3=2$), and the laser beam LB is split into four beams ($N_4=4$).

A paper cassette 70 is arranged beneath the conveyor belt 52. The paper cassette 70 stores recording media, i.e., paper sheets P, on each of which images formed by the image forming units 50(Y, M, C, and B) are to be transferred.

A pick-up roller 72 is arranged on one end portion of the paper cassette 70 and at the side in the vicinity of the tension roller 54. The pick-up roller 72 picks up the paper sheets P stored in the paper cassette 70 one by one in turn from the uppermost one and has a semi-circular section.

Registration rollers 74 are arranged between the pick-up roller 72 and the tension roller 54. The registration rollers 74 align the leading end of one paper sheet P picked up from the cassette 70 with the leading end of a toner image formed on the photosensitive body 58B, by the image forming unit 50B.

A chucking roller 76 is arranged between the registration rollers 74 and the image forming unit 50Y and in the vicinity of the belt driving roller 56, i.e., substantially on the outer circumferential surface of the tension roller 54 to sandwich the conveyor belt 52 therebetween. The chucking roller 76 provides a predetermined electrostatic chucking force to one paper sheet P conveyed at a predetermined timing via the registration rollers 74. Note that the axis of the chucking roller 76 is parallel to that of the tension roller 54.

Registration sensors 78 and 80 for detecting the position of an image formed on the conveyor belt 52 or a sheet-like transfer medium T conveyed by the conveyor belt are arranged in the vicinity of the belt driving roller 56, i.e., substantially on the outer circumferential surface of the belt driving roller 56 to sandwich the conveyor belt 52 therebetween, so as to be separated from each other by a predetermined distance in the axial direction of the belt driving roller 56 (Since FIG. 1 is a front sectional view, only the rear sensor 80 is illustrated).

A conveyor belt cleaner 82 for removing toner attached onto the conveyor belt 52 or paper dust of the paper sheets P is arranged on the conveyor belt 52 at a position corresponding to the outer circumferential surface of the belt driving roller 56.

A fixing unit 84 for fixing toner images transferred onto a paper sheet P thereto is arranged in a direction in which the paper sheet P conveyed via the conveyor belt 52 is released from the tension roller 56 and is further conveyed.

Figure 2:
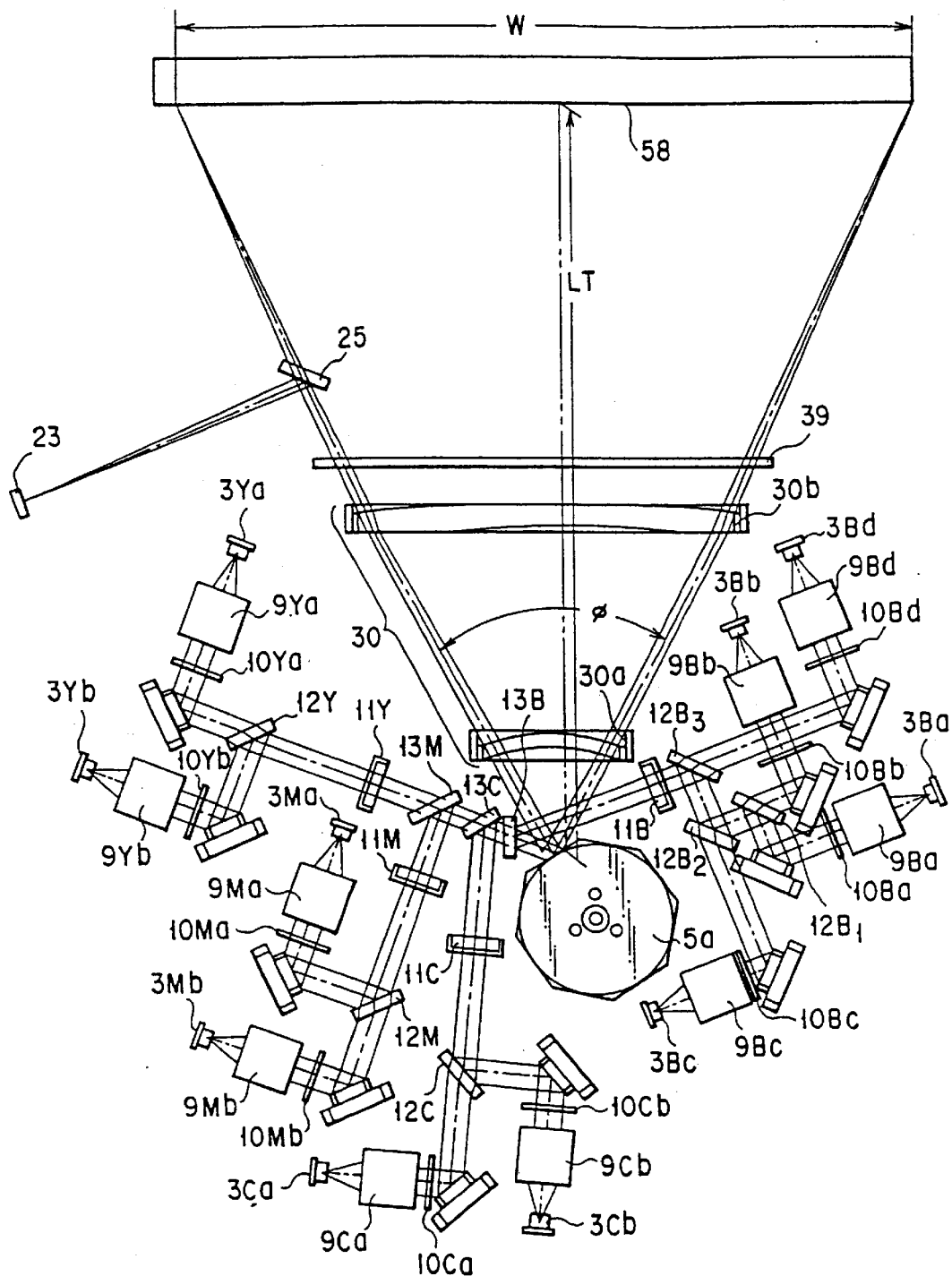
FIG. 2 is a schematic plan view showing the layout of optical members of a light scanning unit built in the image forming apparatus shown in FIG. 1.

FIG. 2 is a schematic plan view of the multi-beam light scanning unit used in the image forming apparatus shown in FIG. 1.

As shown in FIG. 1, the multi-beam light scanning unit 1 has a light deflection unit 5 for deflecting a laser beam emitted by a laser element serving as a light source toward the image surface arranged at a predetermined position, i.e., predetermined positions of the photosensitive drums 58(Y, M, C, and B) of the first to fourth image forming units 50 shown in FIG. 1 at a predetermined linear velocity. Note that the direction in which the laser beam is deflected by each reflection surface of the light deflection unit S will be referred to as a main scanning direction hereinafter.

The light deflection unit 5 has a polygonal mirror main body 5a on which a plurality of (e.g., eight) plane reflection mirrors (surfaces) are arranged in a polygonal pattern, and a motor (not shown) for rotating the polygonal mirror main body 5a at a predetermined speed in the main scanning direction.

The polygonal mirror main body 5a consists of, e.g., aluminum.

Each reflection surface of the polygonal mirror main body 5a is provided by cutting a material along a plane including the rotation direction of the polygonal mirror main body 5a, i.e., a plane perpendicular to the main scanning direction, that is, the sub-scanning direction, and depositing a surface protection layer of, e.g., $SiO_2$ on the cut surface.

A post-deflection optical system 21 is arranged between the light deflection unit 5 and the image surface. The post-deflection optical system 21 gives predetermined optical characteristics to a laser beam deflected in the predetermined direction by each reflection surface of the light deflection unit 5.

The post-deflection optical system 21 includes two, i.e, first and second lenses 30a and 30b, and guides a laser beam reflected in the predetermined direction by each reflection surface of the light deflection unit 5 to the predetermined position of each of the photosensitive drums 58(Y, M, C, and B).

A horizontal synchronization detector 23 is arranged at the position of the second image-forming lens 30b of the post-deflection optical system 21, i.e., at a position corresponding to a predetermined position before a position corresponding to the write start position, on each of the photosensitive drums 58, of an image of each of the laser beams L(Y, M, C, and B) emerging from the second image-forming lens 30b toward the photosensitive drum 58 in the rotation direction of the reflection surface of the light deflection unit 5.

A horizontal synchronization detection mirror 25 is inserted between the post-deflection optical system 21 and the horizontal synchronization detector 23. The mirror 25 reflects some light components of the laser beams L(Y, M, C, and B), which have passed through at least one lens (30a or 30b) included in the post-deflection optical system 21 and are obtained by synthesizing 4×2 beams toward the horizontal synchronization detector 23 in different directions in both the main scanning and sub-scanning directions.

A pre-deflection optical system between the laser element serving as the light source and the light deflection unit 5 will be described in detail below.

The light scanning unit 1 has yellow, magenta, and cyan light sources 3Y, 3M, and 3C each including two, i.e., first and second laser elements ($N_1=N_2=N_3=2$) that satisfy $N_i$ (i is a positive integer), and a fourth light source 3B including four, i.e., first to fourth laser elements ($N_4=4$) that satisfy $N_i$ (i is a positive integer). Note that the number M (M is a positive integer) of beam group light sources is 4.

The first light source 3Y has first and second yellow laser elements 3Ya and 3Yb for emitting laser beams corresponding to Y, i.e., a yellow image. These laser elements 3Ya and 3Yb are arranged to be able to set a predetermined distance in the sub-scanning direction between laser beams LYa and LYb emitted thereby on each reflection surface of the polygonal mirror main body 5a of the light deflection unit 5.

The second light source 3M has first and second magenta laser elements 3Ma and 3Mb for emitting laser beams corresponding to M, i.e., a magenta image. Note that these laser elements 3Ma and 3Mb are also arranged to be able to set a predetermined distance in the sub-scanning direction between laser beams LMa and LMb emitted thereby on each reflection surface of the polygonal mirror main body 5a of the light deflection unit 5.

The third light source 3C has first and second cyan laser elements 3Ca and 3Cb for emitting laser beams corresponding to C, i.e., a cyan image. Note that this light source 3C is also arranged to be able to set a predetermined distance in the sub-scanning direction between laser beams LCa and LCb emitted by its lasers on each reflection surface of the polygonal mirror main body 5a of the light deflection unit 5.

The fourth light source 3B has first, second, third, and fourth black laser elements 3Ba, 3Bb, 3Bc, and 3Bd corresponding to B, i.e., a black image. Note that the light source 3B includes four lasers and is arranged to be able to set a predetermined distance in the sub-scanning direction between adjacent ones of laser beams LBa, LBb, LBc, and LBd emitted from its lasers on each reflection surface of the polygonal mirror main body 5a of the light deflection unit 5 as in the first to third light sources 3Y, 3M, and 3C.

With this arrangement, M sets (M=4) of $N_i$ laser beams, i.e., laser beams LYa, LYb, LMa, LMb, LCa, LCb, LBa, LBb, LBc, and LBd, which are separated by the predetermined distance in the sub-scanning direction on each reflection surface are incident on the reflection surface of the polygonal mirror main body 5a of the light deflection unit 5.

Four (M) sets of pre-deflection optical systems 7(Y, M, C, and B) are arranged between the laser elements 3Ya, 3Yb, 3Ma, 3Mb, 3Ca, 3Cb, 3Ba, 3Bb, 3Bc, and 3Bd, i.e., the four light sources 3Y, 3M, 3C, and 3B, and the light deflection unit 5. Each pre-deflection optical system 7 adjusts, to a predetermined shape, the beam spot sectional shape of each of 2+2+2+4 laser beams, i.e., a total of 10 laser beams LYa, LYb, LMa, LMb, LCa, LCb, LBa, LBb, LBc, and LBd emitted by these light sources.

Finite lenses 9Ya and 9Yb for giving predetermined convergence to the laser elements 3Ya and 3Yb and stops 10Ya and 10Yb for adjusting the beam sectional shapes of laser beams passing through the corresponding finite lenses to a predetermined shape are respectively interposed between the first and second yellow laser elements 3Ya and 3Yb, and the light deflection unit 5. Note that the finite lenses 9Ya and 9Yb must have optical characteristics complementary to those to be given to an image-forming lens group used in the post-deflection optical system (to be described later), and may adopt collimator lenses each for converting a laser beam into collimated light depending on the optical characteristics of the image-forming lens group.

A half mirror 12Y as a semi-transparent mirror is arranged at the crossing position of the laser beams LYa and LYb that have passed through the stops 10Ya and 10Yb. The half mirror 12Y superposes the laser beams LYb and LYa into a beam that may be substantially considered as a single laser beam LY when viewed from the sub-scanning direction. More specifically, the surface, opposite to the surface that receives the laser beam LYa, of the half mirror 12Y receives the laser beam LYb, which is separated from the laser beam LYa by a predetermined beam interval in the sub-scanning direction. Note that the half mirror 12Y is arranged at a predetermined angle so that the laser beams LYa and LYb, which are superposed on each other into a beam that may be substantially considered as a single laser beam LY when viewed from the sub-scanning direction, can be incident on the polygonal mirror main body 5a of the light deflection unit 5.

A cylinder lens 11Y and a laser synthesis mirror unit 13 are arranged between the half mirror 12Y and the light deflection unit 5. The cylinder lens 11Y further converges the laser beam LY superposed by the half mirror 12Y in only the sub-scanning direction. The laser synthesis mirror unit 13 has a plurality of reflection surfaces for guiding the laser beam LY that has passed through the cylinder lens to the light deflection unit 5 substantially as a bundle of light rays, as will be described in detail later with reference to FIGS. 8A and 8B.

The laser synthesis mirror unit 13 also guides other laser beams to be described below substantially as a bundle of light rays to the light deflection unit 5. As can be apparent from FIG. 2, the first and second yellow laser beams LYa and LYb emitted by the first light source 3Y pass through the laser synthesis mirror unit 13 shown in FIGS. BA and BB and are guided to the light deflection unit 5.

Finite lenses 9Ma and 9Mb and stops 10Ma and 10Mb, which respectively correspond to the first and second magenta laser elements 3Ma and 3Mb, a half mirror 12M, and a cylinder lens 11M are interposed between the laser elements 3Ma and 3Mb, and the laser synthesis mirror unit 13.

Likewise, finite lenses 9Ca and 9Cb and stops 10Ca and 10Cb, which respectively correspond to the first and second cyan laser elements 3Ca and 3Cb, a half mirror 12C, and a cylinder lens 11C are arranged between the laser elements 3Ca and 3Cb, and the laser synthesis mirror unit 13.

Furthermore, first to fourth finite lenses 9Ba, 9Bb, 9Bc, and 9Bd that can give optical characteristics similar to the above-mentioned light sources, first to fourth stops 10Ba, 10Bb, 10Bc, and 10Bd, half mirrors 12B$_1$, 12B$_2$, 12B$_3$, and a cylinder lens 11B are inserted between the first, second, third, and fourth black laser elements 3Ba, 3Bb, 3Bc, and 3Bd, and the laser synthesis mirror unit 13.

Note that the light sources 3(Y, M, C, and B), the pre-deflection optical systems 7(Y, M, C, and B), and the laser synthesis mirror unit 13 are integrally held by a holding member (not shown) consisting of, e.g., an aluminum alloy.

The optical characteristics of the lenses and half mirrors used in the pre-deflection optical systems will be explained in detail below.

Each of the finite lenses 9(Y, M, C, and B)a, 9(Y, M, C, and B)b, 9Bc, and 9Bd has a single lens obtained by adhering an ultraviolet-setting plastic aspherical surface lens (not shown) to the surface of an aspherical or spherical surface glass lens.

In order to set all the outputs of the laser elements in the respective beam groups to be identical values and to obtain identical light intensity on the surface, the ratios of reflectance to transmittance of the half mirrors 12(Y, M, and C) and the half mirror 12B$_1$ are respectively set to be 1:1. In contrast to this, the ratios of reflectance to transmittance of the half mirrors 12B$_2$ and 12B$_3$ are respectively set to be 2:1 and 3:1.

More specifically, since each of the first to third light sources 3Y, 3M, and 3C has two lasers ($N_1=N_2=N_3=2$), the required total number of half mirrors 12(Y, M, and C) is managed by $N_i-1$, and each half mirror must synthesize 50% each of the light amounts of the laser beams from the two light sources. Therefore, the ratio of reflectance to transmittance is set to be 1:1, and when the laser beams have passed through the half mirrors 12(Y, M, and C), the light intensities of the laser beams LYa, LYb, LMa, LMb, LCa, and LCb emitted by the laser elements 3Ya, 3Yb, 3Ma, 3Mb, 3Ca, and 3Cb are controlled to be substantially equal to each other.

On the other hand, the half mirror 12B$_1$ which synthesizes the laser beams LBa and LBb from the first and second laser elements 3Ba and 3Bb has the same reflectance and transmittance as those of the half mirrors 12(Y, M, and C) since it synthesizes 50% each of the light amounts of the laser beams from the two light sources. In contrast to this, since the half mirror 12B$_2$ synthesizes the laser beam LBa that has already been synthesized by the half mirror 12B$_1$ with the laser beam LBc from the third black laser element 3Bc, the light intensities of the laser beams LBa, LBb, and LBc can be set to be equal to each other when the ratio of reflectance to transmittance is set to be 2:1. Similarly, since the half mirror 12B$_3$ synthesizes the laser beam LBc that has already been synthesized by the half mirror 12B$_2$ with the laser beam LBd from the fourth black laser element 3Bd, the light intensities of the laser beams LBa, LBb, LBc, and LBd emitted by the laser elements 3Ba, 3Bb, 3Bc, and 3Bd can be set to be equal to each other by setting the ratio of reflectance to transmittance to be 3:1, when the laser beams have passed through the half mirror 12B$_3$.

The light intensities of the laser beams LBa, LBb, LBc, and LBd entering the hybrid cylinder lens 11B decrease to about 25% as compared to those when they are emitted by the laser elements 3Ba, 3Bb, 3Bc, and 3Bd.

In contrast to this, the light intensities of the laser beams LYa, LYb, LMa, LMb, LCa, and LCb that enter the hybrid lenses 11(Y, M, and C) via the half mirrors 12(Y, M, and C) are held to be 50% as compared to those when they are emitted by the laser elements 3Ya, 3Yb, 3Ma, 3Mb, 3Ca, and 3Cb.

Therefore, in the example shown in FIG. 2, when the rated outputs of the laser elements 3Ya, 3Yb, 3Ma, 3Mb, 3Ca, and 3Cb are set to be 10 milliwatts (to be abbreviated as mW hereinafter), and the rated outputs of the laser elements 3Ba, 3Bb, 3Bc, and 3Bd are set to be 20 mW, different numbers of laser beams for different colors can be set to have substantially equal light intensities at the imaging position.

As is known, the optimal light intensity of a laser beam on the image surface varies in association with variations of the characteristics of toners used in the developing units 62(Y, M, C, and B) and/or errors of the characteristics of the individual photosensitive drums 58(Y, M, C, and B) used in the image forming units 50(Y, M, C, and B). On the other hand, toners corresponding to the respective color components are often required to use different light intensities and beam sizes owing to the characteristics of their coloring agents, transfer methods, and the like. However, the light intensities and beam sizes in the image forming unit corresponding to one color component must be substantially uniform.

More specifically, the light intensities of the laser beam groups LY, LM, LC, and LB need not be uniform among the image forming units 50(Y, M, C, and B), but the $N_i$ beams in each beam group must have uniform light intensities and beam sizes on the image surface.

For example, if the yellow laser beams LYa and LYb have equal light intensities but the beam size of the beam LYa is smaller than that of the beam LYb, the width of a latent image written on the photosensitive drum 58Y by the yellow laser beam LYa becomes smaller than that of a latent image written on the photosensitive drum 58Y by the yellow laser beam LYb. For example, when lines are to be written in the main scanning direction at every third line positions, the thicknesses of the lines vary, resulting in a non-uniform image.

In this way, the yellow laser beams LYa and LYb, magenta laser beams LMa and LMb, cyan laser beams LCa and LCb, and black laser beams LBa, LBb, LBc, and LBd are required to have equal light intensities and uniform beam sizes on the image surface.

For these reasons, in the embodiment of the present invention, the rated outputs of the laser elements 3Y*a* and 3Y*b* that emit the laser beams LYa and LYb synthesized in the main scanning direction by the half mirror 12Y are set to be 10 mW. Also, the rated outputs of the laser elements 3M*a* and 3M*b* that emit the laser beams LMa and LMb synthesized in the main scanning direction by the half mirror 12M are set to be 10 mW. Likewise, the rated outputs of the laser elements 3C*a* and 3C*b* that emit the laser beams LCa and LCb synthesized in the main scanning direction by the half mirror 12C are set to be 10 mW. Note that the rated outputs of the laser elements 3B*a*, 3B*b*, 3B*c*, and 3B*d* that emit the laser beams LBa, LBb, LBc, and LBd synthesized by the half mirrors 12$B_1$, 12$B_2$, and 12$B_3$ are set to be 20 mW.

The beam sizes of the laser beams in the beam groups, i.e., the beam sizes on the image surface of the laser beams LYa and LYb, LMa and LMb, and LCa and LCa in the beam groups can be easily uniformed using identical finite lenses and stops.

In the optical apparatus shown in FIG. 2, if the ratios of reflectance to transmittance of all the half mirrors 12$B_1$, 12$B_2$, and 12$B_3$ are set to be 1:1, in order to obtain uniform light intensities on the image surface, the rated outputs of the laser elements 3B*a*, 3B*b*, 3B*c*, and 3B*d* must be respectively set to be 40 mW, 40 mW, 20 mW, and 10 mW. In this case, the beam sizes vary on the image surface due to the above-mentioned radiation angle differences of the laser beams.

In this case, it is easy to hit upon a method of using laser elements having identical rated outputs, i.e., 40 mW as the laser elements 3B*a*, 3B*b*, 3B*c*, and 3B*d*, and controlling the outputs in actual use to be 40 mW, 40 mW, 20 mW, and 10 mW. However, with this method, the laser elements 3B*c* and 3B*d* apparently have over-specifications, resulting in an increase in cost.

The number of half mirrors 12 prepared for each of the laser beams LY, LM, LC, and LB is $N_i$–1 (1 for yellow, magenta, and cyan, and 3 for black) of the number N of beams that constitute each of the M sets of light sources. However, the number of times of passing through the half mirror 12 is limited to a maximum of unity independently of the laser beams.

In other words, the laser beams LYb, LMa, LCb, and LBa are merely reflected by the half mirrors 12 (the number of times of passing=0), and the remaining laser beams pass through the half mirrors 12 only once.

As described above, by minimizing the number of times of passing of the laser beams via the half mirrors 12 and the differences in the numbers of times of passing among beams, variations in focal length or the influence of spherical aberration as problems posed when light other than collimated light passes through a plane-parallel plate can be reduced. When each of the laser beams LYb, LMa, LCb, and LBa which do not pass through any half mirrors 12 passes through plane-parallel plates with a refractive index equal to that of the half mirrors 12, variations in optical characteristics caused by the differences in the number of times of passing among beams can be reduced.

Tables 1 to 3 below summarize optical numerical value data of the pre-deflection optical system 7.

TABLE 1

Pre-deflection optical system lens data
(Unit of angle: rad, unit of length: mm)
Effective field angle Ø : 1.01237
Radius of inscribed circuit of reflection surface of light deflection unit: 33
separation angle: 0.6981317
Center of rotation of reflection surface of light deflection unit: (26.28,20.02)
For magenta

| Curvature | | | | |
|---|---|---|---|---|
| CUY | CUX | Thickness | Material | Remarks |
| | | 13.682 | Air | f = 13.29, NA 0.33, |
| | | 11.219 | Air | Finite lens |
| 0 | −0.0072603 | 1.5000000 | PMMA | |
| 0 | 0.0443797 | 5.0000000 | LAH78 | |
| | | 53.9022942 | Air | |

| | |
|---|---|
| Decentering of chief ray incident on LMa cylinder lens | −1.124 |
| Tilt of chief ray incident on LMa cylinder lens | −0.0177 |
| Decentering of chief ray incident on LMb cylinder lens | −1.099 |
| Tilt of ray incident on LMb cylinder lens | −0.0174 |
| Offset of optical axis of system of LM pre-deflection optical system on reflection surface from optical axis of system of post-deflection optical system | 0.294 |
| Tile of optical axis of system of LM pre-deflection optical system on reflection surface from optical axis of system of post-deflection optical system | 0.016 |

TABLE 2

For cyan

| Curvature | | | | |
|---|---|---|---|---|
| CUY | CUX | Thickness | Material | Remarks |
| | | | Air | f = 13.29, NA 0.33, |
| | | 10.253 | Air | Finite lens |
| — | −0.0072603 | 1.5000000 | PMMA | |
| — | 0.0443797 | 5.0000000 | LAH78 | |
| — | | 54.6292496 | Air | |

| | |
|---|---|
| Decentering of chief ray incident on LCa cylinder lens | 1.571 |
| Tilt of chief ray incident on LCa cylinder lens | −0.0134 |
| Decentering of chief ray incident on LCb cylinder lends | 1.2509 |
| Tilt of chief ray incident on LCb cylinder lens | −0.0136 |
| Offset of optical axis of system of LC pre-deflection optical system on reflection surface from optical axis of system of post-deflection optical system | 1.793 |
| Tilt of optical axis of system of LC pre-deflection optical system on reflection surface from optical axis of system of post-deflection optical system | 0.014 |

TABLE 3

For yellow, black

| Curvature | | | | |
|---|---|---|---|---|
| CUY | CUX | Thickness | Material | Remarks |
|  |  | 13.682 | Air | f = 13.29, NA 0.33, |
|  |  | 6.773 | Air | Finite lens |
| — | −0.0072603 | 1.5000000 | PMMA |  |
| — | 0.0443797 | 5.0000000 | LAH78 |  |
| — |  | 54.4181824 | Air |  |

| | |
|---|---|
| Decentering of chief ray incident on LYa cylinder lens | −2.831 |
| Tilt of chief ray incident on LYa cylinder lens | −1.695D-005 |
| Decentering of chief ray incident on LYb cylinder lens | −2.766 |
| Tilt of chief ray incident on LYb cylinder lens | 1.661D-004 |
| Offset of optical axis of system of LY pre-deflection optical system on reflection surface from optical axis of system of post-deflection optical system | −1.884 |
| Tilt of optical axis of system of LY pre-deflection optical system on reflection surface from optical axis of system of post-deflection optical system | 4.850D-044 |
| Decentering of chief ray incident on LBa cylinder lens | 2.831 |
| Tilt of chief ray incident on LBa cylinder lens | 1.695D-005 |
| Decentering of chief ray incident on LBb cylinder lens | 2.766 |
| Tilt of chief ray incident on LBb cylinder lens | −1.661D-004 |
| Decentering of chief ray incident on LBc cylinder lens | 2.701 |
| Tilt of chief ray incident on LBc cylinder lens | −3.153D-004 |
| Decentering of chief ray incident on LBd cylinder lens | 2.636 |
| Tilt of chief ray incident on LBd cylinder lens | −4.644D-004 |
| Offset of optical axis of system of LB pre-deflection optical system on reflection surface from optical axis of system of post-deflection optical system | 1.884 |
| Tilt of optical axis of system of LB pre-deflection optical system on reflection surface from optical axis. of system of post-deflection optical system | −4.850D-004 |

As can be seen from Tables 1 to 3, the finite lenses 9 and the cylinder lenses 11 alone corresponding to the respective color components use identical lenses independently of color components. Note that the pre-deflection optical system 7Y corresponding to the Y (yellow) image forming unit 58Y and the pre-deflection optical system 7B corresponding to the B (black) image forming unit 58B, which are respectively located on the most upstream and downstream sides in the rotation direction of the conveyor belt 52 serving as a transfer belt have substantially the same lens layouts (which are symmetrical about the optical axis of the system). On the other hand, each of the pre-deflection optical system 7M corresponding to M (magenta) and the pre-deflection optical system 7C corresponding to C (cyan) has a larger interval between the finite focal lens 9 and the cylinder lens 11 as compared to that in the pre-deflection optical systems 7Y and 7B.

On the other hand, a maximum distance is set between the cylinder lenses 11 and the reflection surface of the light deflection unit 5 in association with the laser beams at the two ends, i.e., the laser beams LY and LB. As can be seen from FIG. 2, this can eliminate limitations (mounting surface) associated with the layouts of the laser elements 3(Y, M, C, and B)a and 3(Y, M, C, and B)b, and the third and fourth black laser elements 3Bc and 3Bd, and the corresponding finite lenses 9(Y, M, C, and B)a and 9(Y, M, C, and B)b, and finite lenses 9Bc and 9Bd upon constituting each of a plurality of light sources using a plurality of lasers.

The functions of the pre-deflection optical systems having effects on the laser beams propagating from the light sources toward the light deflection unit will be explained below with reference to FIG. 3.

Note that the lenses and half mirrors arranged between the light sources and the light deflection unit have substantially the same effects. Hence, the laser beam LYa propagating from the first yellow laser element 3Ya toward the polygonal mirror main body 5a of the light deflection unit 5 will be described below as an example.

As shown in FIG. 3, the laser beam LYa emitted by the first yellow laser element 3Ya is given predetermined convergence by the finite lens 9Ya, and then passes through the stop 10Ya, so that its beam sectional shape is adjusted to a predetermined shape.

The laser beam LY (LYa+LYb), which is synthesized into a substantially single laser beam by the half mirror 12Y to be separated by a predetermined distance in the sub-scanning direction from the laser beam LYb (not shown in FIG. 3) coming from the second yellow laser element 3Yb (to be described later), passes through a non-reflection region of the laser synthesis mirror unit 13 (to be described later with reference to FIGS. 8A and 8B), and is synthesized with the remaining three groups of laser beams LM, LC, and LB when viewed from the sub-scanning direction. Then, the synthesized laser beam is guided to the light deflection unit 5.

The cylinder lens 11Y is integrally formed by adhering the exit surface of a first cylinder lens 17Y and the incident surface of a second cylinder lens 19Y or by pressing them from a predetermined direction toward a positioning member (not shown). The surface, contacting air, i.e., the incident surface, of the lens 17Y is formed into a cylindrical surface, and is given a substantially equal curvature in the sub-scanning direction. The first cylinder lens 17Y consists of plastic, e.g., PMMA (polymethyl methacrylate). The second cylinder lens 19Y consists of glass, e.g., TaSF21.

Note that the cylinder lenses 17Y and 19Y are fixed via a positioning mechanism (not shown) integrally formed with a holding member 15 to be separated by an accurate distance from the finite lens 9Ya or 9Yb.

The laser beam LYa enters the cylinder lens 11Y to be decentered and tilted from the optical axis of the lens 11Y to cancel coma generated when the laser beam LYa passes through the first and second image-forming lenses 30a and 30b (as indicated by an alternate long and short dashed line extending from the incident surface of the cylinder lens indicated by 17Ya in FIG. 3).

The laser beam LYb (not shown) enters the cylinder lens 11Y to be asymmetrical with the laser beam LYa with respect to the optical axis of the lens 11Y. Note that the laser beam LYb enters the cylinder lens 11Y to substantially overlap the laser beam LYa if it is illustrated under the same condition as in FIG. 3.

Tables 4 and 5A, 5B, 5C and 5D below summarize optical numerical value data of the post-deflection optical system used in combination with the post-deflection optical systems shown in Tables 1 to 3 above.

TABLE 4

Post-deflection optical system
(Unit of angle: rad, unit of length: min)
Direction where light rays travel are from + to −

| Curvature | | | | |
|---|---|---|---|---|
| CUY | CUX | Thickness | Material | Remarks |
|  |  | −36.7780266 | Air |  |
| 0.0189634 | −0.0231677 |  |  | Decentering in |
|  |  | −6.5294938 | PMMA | y-direction −4.364 |
| 0.0207366 | 0.0119239 |  |  | First surface |

TABLE 4-continued

| | | | | |
|---|---|---|---|---|
| | | −105.4906235 | Air | Second surface |
| 0.0034197 | −0.0045480 | | | Third surface |
| | | −6.0077405 | PMMA | |
| 0.0021422 | −0.0179737 | | | Fourth surface |
| | | −2.9985602 | Air | For tilts, see data |
| — | — | | | listed below |
| | | −2.0000000 | BK7 | - sign of tilt |
| — | — | | | For LC −170.061 |

TABLE 4-continued

| | | | |
|---|---|---|---|
| −170.000 | Air | For LY, LB | |
| | | −170.336 | |
| Tilt of LM incident cover glass | | 0.267636366395237 | |
| Tilt of LC incident cover glass | | −0.392835532361101 | |
| Tilt of LY incident cover glass | | 0.727422457105662 | |
| Tilt of LB incident cover glass | | −0.727422457105662 | |

TABLE 5A

Polynomial coefficients for first surface

| | 0 | 1 | 2 | 3 | 4 | 5 | 6 | 7 | 8 | 9 | 10 |
|---|---|---|---|---|---|---|---|---|---|---|---|
| 0 | 0.00 | −0.03 | 0.00 | 2.75E-5 | −5.41E-9 | −7.18E-9 | −3.97E-10 | 3.53E-11 | −7.41E-13 | −1.16E-14 | 7.48E-16 |
| 1 | 0.00 | 6.30E-5 | −4.56E-7 | 2.51E-8 | 1.03E-9 | −1.03E-10 | 7.45E-12 | −2.59E-13 | −3.18E-15 | 7.31E-18 | 5.10E-18 |
| 2 | 4.58E-4 | −5.97E-6 | 6.10E-8 | 4.08E-8 | −2.11E-9 | 1.67E-11 | 2.56E-12 | −4.78E-14 | 5.85E-16 | −2.45E-16 | 6.79E-18 |
| 3 | −6.17E-6 | 9.02E-7 | −6.46E-8 | −4.43E-9 | 2.38E-10 | 3.48E-12 | −2.36E-13 | −1.97E-15 | 4.73E-17 | −1.23E-18 | 1.38E-19 |
| 4 | −8.19E-9 | −1.88E-8 | 1.22E-9 | 7.25E-11 | −2.77E-12 | 0.00 | 0.00 | 0.00 | 0.00 | 0.00 | 0.00 |

Table 5B

Polynomial coefficients for second surface

| | 0 | 1 | 2 | 3 | 4 | 5 | 6 | 7 | 8 | 9 | 10 |
|---|---|---|---|---|---|---|---|---|---|---|---|
| 0 | 0.00 | −0.059 | 0.00 | 1.47E-5 | −4.75E-6 | 9.18E-9 | −1.09E-9 | 1.24E-11 | −2.55E-13 | 1.49E-15 | 2.39E-16 |
| 1 | 0.00 | 7.41E-5 | −2.86E-6 | 7.25E-8 | −4.40E-9 | −4.55E-11 | 1.31E-11 | −4.38E-13 | −2.87E-15 | −3.30E-17 | 7.03E-18 |
| 2 | 3.58E-4 | −1.37E-6 | −2.50E-7 | −1.22E-8 | −8.21E-11 | −9.38E-11 | −1.70E-12 | −5.24E-14 | 2.05E-15 | 3.82E-18 | −2.77E-18 |
| 3 | −5.14E-5 | 2.42E-7 | −4.41E-8 | −1.56E-9 | −3.51E-11 | −7.16E-13 | −9.04E-14 | −5.47E-15 | 1.75E-16 | −1.16E-18 | 5.47E-21 |
| 4 | 1.49E-6 | −2.29E-8 | 2.95E-10 | 1.06E-10 | −4.17E-12 | 0.00 | 0.00 | 0.00 | 0.00 | 0.00 | 0.00 |

TABLE 5C

Polynomial coefficients for third surface

| | 0 | 1 | 2 | 3 | 4 | 5 | 6 | 7 | 8 | 9 | 10 |
|---|---|---|---|---|---|---|---|---|---|---|---|
| 0 | 0.00 | 0.016 | 0.00 | −3.05E-6 | −2.57E-7 | −4.42E-10 | 1.42E-11 | 2.66E-14 | −7.79E-16 | 1.77E-18 | −1.71E-20 |
| 1 | 0.00 | −2.50E-5 | 5.27E-7 | 1.36E-9 | 7.55E-11 | 4.20E-13 | −1.84E-14 | 8.66E-17 | −1.05E-18 | 3.80E-21 | 9.74E-24 |
| 2 | −6.25E-6 | −5.97E-8 | −2.98E-10 | 1.65E-11 | −6.53E-14 | 3.01E-17 | 1.21E-17 | −5.55E-19 | 7.01E-22 | 3.37E-23 | −1.54E-25 |
| 3 | −1.22E-8 | −1.26E-10 | −2.71E-12 | 6.67E-14 | 6.18E-17 | −6.16E-18 | 7.99E-20 | −2.75E-22 | −2.15E-25 | 9.22E-26 | 1.15E-27 |
| 4 | 1.10E-10 | 5.84E-13 | 7.24E-14 | −5.44E-16 | −8.17E-18 | 0.00 | 0.00 | 0.00 | 0.00 | 0.00 | 0.00 |

TABLE 5D

Polynomial coefficients for fourth surface

| | 0 | 1 | 2 | 3 | 4 | 5 | 6 | 7 | 8 | 9 | 10 |
|---|---|---|---|---|---|---|---|---|---|---|---|
| 0 | 0.00 | 0.011 | 0.00 | −3.12E-6 | −6.22E-8 | 4.30E-10 | −1.80E-13 | 6.10E-15 | 1.86E-16 | 4.47E-18 | −6.12E-20 |
| 1 | 0.00 | −1.81E-5 | 2.52E-7 | 6.63E-10 | 1.39E-11 | 4.05E-13 | −1.85E-15 | 3.12E-17 | −1.83E-18 | 1.35E-20 | −5.53E-23 |
| 2 | −1.01E-5 | −6.82E-8 | 1.61E-10 | 1.98E-11 | −3.41E-14 | −1.20E-15 | −1.06E-17 | −1.04E-19 | 1.52E-21 | −1.36E-24 | −9.05E-26 |
| 3 | −2.15E-8 | 8.10E-11 | 3.66E-12 | 2.91E-14 | −6.60E-16 | 4.83E-18 | 2.27E-20 | −7.17E-22 | −3.48E-24 | 1.64E-26 | 2.08E-27 |
| 4 | 1.22E-10 | 1.52E-12 | −7.17E-15 | −6.57E-16 | 4.40E-18 | 0.00 | 0.00 | 0.00 | 0.00 | 0.00 | 0.00 |

By using the post-deflection optical system shown in Tables 4 and 5 above, even when the maximum value of the surface inclination of each reflection surface of the light deflection unit is assumed to be 1", the position displacement of the beam on the image surface can be suppressed to 4 μm.

More specifically, the post-deflection optical system shown in Table 4 has a 1/48× surface inclination correction function with respect to the surface inclination of each reflection surface of the light deflection unit 5. If the post-deflection optical system has no surface inclination correction function, the inclination of each reflection surface of the light deflection unit 5 must be reduced to about 2' so as to reduce the surface inclination among the reflection surfaces of the light deflection unit 5 to a degree that jitter is not visually perceived. As a consequence, the polygonal mirror main body 5a becomes very expensive.

The effective field angle, φ, of a beam deflected by the light deflection unit 5 is 1.01237 radians (to be abbreviated as rad hereinafter), the effective image region width, W, including the horizontal synchronization signal detection region is 320 millimeters (to be abbreviated as mm hereinafter), and the distance, LT, between the reflection point on each reflection surface of the light deflection unit 5 and the image surface is 329.797 mm. By optimizing the beam effective field angle φ, the effective image region width W, and the distance LT between the reflection point and the image surface to satisfy:

$$1.01237 = \phi > W/LT = 0.97$$

the imaging characteristics, bend of scanning lines, and the like required for multi-beams can be avoided from deteriorating due to environmental changes, and the laser driving frequency for driving the laser elements used in the light sources can be lowered. Hence, the size of the light scanning unit can also be reduced. Even when plastic lenses are used in the post-deflection optical system, an optical unit suffering less color misregistration with respect to changes in temperature and humidity can be provided.

Note that φ>W/LT is obtained as a result of simulations using the effective field angle φ and W/LT (the effective image region width/the distance between the reflection point and the image surface) as variables of optimization design. In the region φ<W/LT, the bend of scanning lines and deterioration of the imaging characteristics become large with respect to changes in temperature and humidity. Also, the manufacturing tolerance becomes stricter. On the other hand, in the region φ>1.2(W/LT), the bend of scanning lines becomes large with respect to changes in temperature and humidity.

In view of the foregoing, the beam effective field angle φ is preferably selected from the range 1.2(W/LT)>φ>W/LT. Note that an evaluation function shown in FIG. 4 is used upon evaluating the beam effective field angle φ.

Referring to FIG. 4, the evaluation function becomes small as a whole near φ=1, but also becomes small near φ=1.1(W/LT).

FIG. 5 shows the laser beams LY, LM, and LC (LY has LYa and LYb, LM consists of LMa and LMb, and LC has LCa and LCb) propagating from reflection surfaces 13Y, 13M, and 13C in the laser synthesis mirror unit in a direction (i.e., the sub-scanning direction) perpendicular to the rotation axis of each reflection surface of the light deflection unit 5 toward the light deflection unit 5 in the pre-deflection optical systems 7(Y, M, C, and B) shown in FIG. 3 and Tables 1 to 3.

As can be seen from FIG. 5, the laser beams LY, LM, LC, and LB are guided toward the light deflection unit 5 to be separated by different intervals in a direction parallel to the rotation axis of the reflection surface of the light deflection unit 5. The laser beams LM and LC are guided toward each reflection surface of the light deflection unit 5 to be asymmetrical with each other to sandwich, therebetween, a plane perpendicular to the rotation axis of the reflection surface of the light deflection unit 5 and including the center, in the sub-scanning direction of the reflection surface, i.e., a plane including the optical axis of the system of the light scanning unit 1. Note that the intervals between two adjacent ones of the laser beams LY, LM, LC, and LB on each reflection surface of the light deflection unit 5 are 2.26 mm (between LY and LM), 1.71 mm (between LM and LC), and 1.45 mm (between LC and LB).

Figure 6:
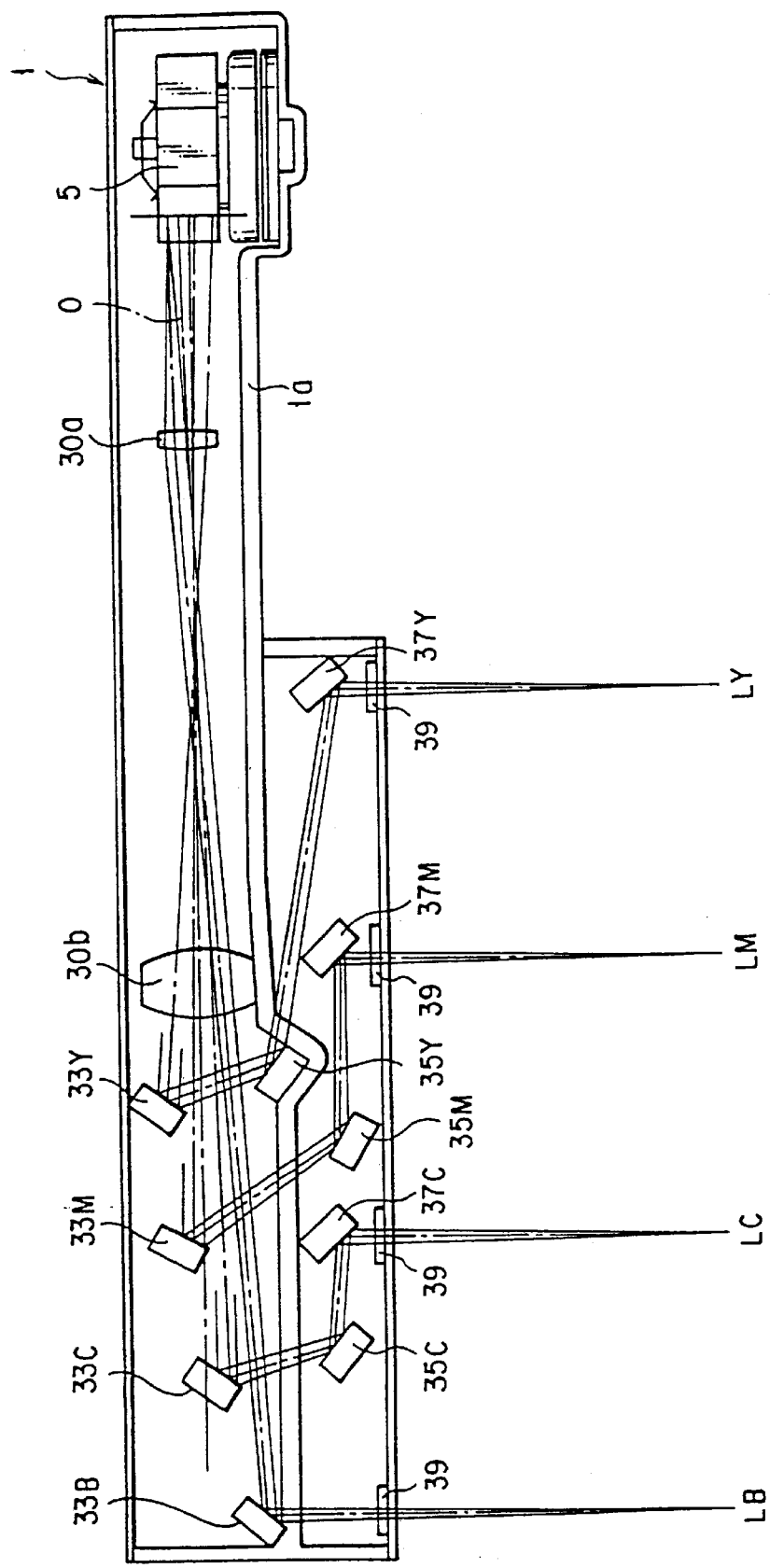
FIG. 6 is a schematic sectional view of the optical scanning unit shown in FIG. 2 taken along at the position where the deflection angle of the light deflection unit is 0°.

FIG. 6 shows the state wherein the optical members arranged between the light deflection unit 5 in the light scanning unit 1 to each photosensitive drum 58, i.e., the image surface are viewed at a position where the deflection angle of the light deflection unit 5 is 0° and from the sub-scanning direction.

As shown in FIG. 6, first mirrors 3(Y, M, C, and B) for bending the optical paths of a total of 10 (=2+2+2+4) laser beams L(Y, M, C, and B) that have passed through the image-forming lens 30b toward the image surface, and second and third mirrors 35Y, 35M, 35C, 37Y, 37M, and 37C for further bending the optical paths of the laser beams LY, LM, and LC bent by the first mirrors 33Y, 33M, and 33C are arranged between the second image-forming lens 30b of the post-deflection optical system 30 and the image surface. As can be seen from FIG. 6, the laser beam LB corresponding to a B (black) image is returned by the first mirror 33B, and is then guided toward the image surface without going through any other mirrors.

The first and second image-forming lenses 30a and 30b, the first mirrors 33(Y, M, C, and B), and second mirrors 35Y, 35M, and 35C are fixed by, e.g., an adhesive to a plurality of fixing members (not shown), which are formed by integral molding on an intermediate base la of the light scanning unit 1.

The third mirrors 37Y, 37M, and 37C are arranged to be movable in at least one direction associated with a direction perpendicular to the mirror surface via fixing ribs and a tilt adjustment mechanism (to be described later with reference to FIG. 16).

Dust-proof glass plates 39(Y, M, C, and B) for protecting the interior of the light scanning unit 1 from dust are arranged between the third mirrors 37Y, 37M, and 37C and the first mirror 33B, and the image surface, and at positions where the 10 (=2+2+2 +4) laser beams L(Y, M, C, and B) reflected via the mirrors 33B, 37Y, 37M, and 37C exit the light scanning unit 1.

The optical characteristics between the cylinder lenses and the post-deflection optical system will be described in detail below.

As is known, since the post-deflection optical system 30, i.e., the two, first and second image-forming lenses 30a and 30b made of plastic, e.g., PMMA, the refractive index n of these lenses changes from 1.4876 to 1.4798 when the ambient temperature changes from 0° C. to 50° C. In this case, the imaging surface where the laser beam that has passed through the first and second image-forming lenses 30a and 30b is actually focused, i.e., the imaging position in the sub-scanning direction, varies by about ±4 mm.

In contrast to this, by assembling lenses consisting of the same material as that used in the post-deflection optical system 30 in the pre-deflection optical systems 7 in FIG. 3 while optimizing their curvatures, variations in imaging surface generated upon variations in refractive index n caused by changes in temperature can be suppressed to about ±0.5 mm. More specifically, as compared to a conventional optical system in which the pre-deflection optical systems 7 are constituted by glass lenses and the post-deflection optical system 30 is constituted by plastic lenses, chromatic aberration in the sub-scanning direction generated due to changes in refractive index, caused by changes in temperature, of the lenses in the post-deflection optical system 30 can be corrected.

However, the correction amount of chromatic aberration that can be corrected is proportional to the power of a plastic cylinder lens. More specifically, since the correctable amount of chromatic aberration is determined in accordance with the difference between the incident surface curvature and the exit surface curvature of the plastic cylinder lens, the curvature of a glass cylinder lens can be specified if the incident surface of the plastic cylinder lens is assumed to be a flat surface. As a result, if the material used in the glass cylinder lens is specified, the focal length of the cylinder lens can be determined.

Therefore, when the optical characteristics of the post-deflection optical system are determined, the minimum beam size in the sub-scanning direction can be set by only the focal length of the cylinder lens. In this case, a sufficiently large degree of freedom in design cannot be assured, and a target beam size and achromaticity cannot be realized at the same time.

As another method, the focal length of the cylinder lens may be set by adjusting the focal length of the glass cylinder lens by changing the refractive index upon changing a glass material. However, some glass materials are not always suitable for grinding, storage, or transportation, and the degree of freedom inevitably lowers.

As still another method, curvatures may be given to both the incident surface and the exit surface of the glass cylinder lens, so that the powers of the plastic cylinder lens and the glass cylinder lens are defined by independent functions.

However, by the above-mentioned method of giving curvatures to the two surfaces of the plastic cylinder lens formed by molding and defining the powers of the plastic cylinder lens and the cylinder lens by independent functions, cost can be minimized. According to this method, high machining precision and shape precision can be easily assured.

FIGS. 7A and 7B show the relationship between the first to fourth synthesized laser beams L(Y, M, C, and B) that pass between the light deflection unit 5 shown in FIG. 6 and the image surface, and the optical axis of the system, in the sub-scanning direction, of the light scanning unit 1.

As shown in FIGS. 7A and 7B, the first to fourth synthesized laser beams L(Y, M, C, and B) reflected by each reflection surface of the light deflection unit 5 cross the optical axis of the system in the sub-scanning direction between the first and second image-forming lenses 30*a* and 30*b*, and are guided to the image surface.

FIGS. 8A and 8B show the laser synthesis mirror unit 13 which guides the first to fourth synthesized laser beams LY, LM, LC, and LB as a bundle of laser beams to each reflection surface of the light deflection unit 5.

The laser synthesis mirror unit 13 is constituted by the first to third mirrors 13M, 13C, and 13B arranged in correspondence with the number of color components (the number of color-separated colors)—"1", first to third mirror holding members 13α, 13β, and 13γ, and a base 13*a* for supporting these holding members 13α, 13β, and 13γ. Note that the base 13*a* and the holding members 13α, 13β, and 13γ are integrally formed using a material with a small thermal expansion coefficient, e.g., an aluminum alloy.

At this time, the laser beam LY from the light source 3Y, i.e., from the first and second yellow laser elements 3Y*a* and 3Y*b*, is directly guided to each reflection surface of the light deflection unit 5, as has already been described above. In this case, the laser beam LY passes through the base 13*a* side of the optical axis of the system of the light scanning unit 1, i.e., between the mirror 13M fixed to the first holding member 13α and the base 13*a*.

The light intensities (light amounts) of the laser beams LM, LC, and LB, which are reflected by the mirrors 13M, 13C, and 13B of the synthesis mirror unit 13 shown in FIGS. 8A and 8B, and are then guided to the light deflection unit 5, and the laser beam LY directly guided to the light deflection unit 5 will be examined below.

With the laser synthesis mirror unit 13, the laser beams LM, LC, and LB are returned by the normal mirrors (13M, 13C, and 13B) in a region, where the laser beams LM, LC, and LB are separated in the sub-scanning direction, before they become incident on each reflection surface of the light deflection unit 5. Therefore, the light amounts of the laser beams L(M, C, and B), which are reflected by the reflection surfaces (13M, 13C, and 13B) and are then guided toward the polygonal mirror main body 5*a*, can be maintained to be about 90% or more of those output from the cylinder lenses 11. Since not only the outputs from the laser elements can be reduced but also no aberrations are generated by an inclined plane-parallel plate, aberrations of light that reaches the image surface can be uniformly corrected. Hence, the beam size of each laser beam can be reduced, and consequently, high-definition recording can be realized. Note that the laser beams emitted by the laser elements 3Y*a* and 3Y*b* corresponding to Y (yellow) are directly guided to each reflection surface of the light deflection unit 5 without being reflected by any mirrors in the synthesis mirror unit 13. Hence, not only the output capacities of the lasers can be reduced, but also errors of the incident angles owing to reflection by the mirrors (13M, 13C, and 13B; such errors may be generated in other laser beams reflected by the synthesis mirror unit) can be removed.

The relationship among the laser beams L(Y, M, C, and B) reflected by each reflection surface of the light deflection unit, the tilts of the laser beams LY, LM, LC, and LB, which are output from the light scanning unit 1 via the post-deflection optical system 30, and the mirrors 33B, 33Y, 37M, and 37C will be explained below with reference to FIGS. 2 to 6.

As has already been described above, the laser beams LY, LM, LC, and LB, which are reflected by the polygonal mirror main body 5*a* of the light deflection unit 5 and are given predetermined aberration characteristics by the first and second image-forming lenses 30*a* and 30*b*, are returned in a predetermined direction via the first mirrors 33Y, 33M, 33C, and 33B.

At this time, the laser beam LB is reflected by the first mirror 33B, and is then guided to the photosensitive drum 58B via the dust-proof glass plate 39B. In contrast to this, the remaining laser beams LY, LM, and LC are guided by the second mirrors 35Y, 35M, and 35C, are reflected by the second mirrors 35Y, 35M, and 35C toward the third mirrors 37Y, 37M, and 37C, and are then reflected by the third mirrors 37Y, 37M, and 37C. Thereafter, these laser beams are imaged on the corresponding photosensitive drums to be separated by nearly equal intervals via the dust-proof glass plates 39Y, 39M, and 39C. In this case, the laser beam LB output via the first mirror 33B, and the laser beam LC adjacent to the laser beam LB are also imaged on the photosensitive drums 58B and 58C to be separated by nearly equal intervals.

After the laser beam LB is reflected by each reflection surface of the polygonal mirror main body 5a, it is reflected by only the mirror 33B, and is then output from the light scanning unit 1 toward the photosensitive drum 58B.

When a plurality of mirrors are present along the optical path, the laser beam LB is effectively used as reference light rays upon relatively correcting the remaining laser beams L(Y, M, and C) in association with variations in various aberration characteristics, bend, and the like, which increase (are multiplied) as the number of mirrors increases.

When a plurality of mirrors are present in the optical path, the number of mirrors used for each of the laser beams LY, LM, LC, and LB is preferably adjusted to be an odd or even value. More specifically, as shown in FIG. 5, the number of mirrors in the post-deflection optical system associated with the laser beam LB is one (odd value) except for the polygonal mirror main body 5a of the light deflection unit 5, and the number of mirrors in the post-deflection optical system associated with each of the laser beams LC, LM, and LY is three (odd value) except for the polygonal mirror main body 5a of the light deflection unit 5. Assuming that the second mirror 35 is omitted in association with one of the laser beams LC, LM, and LY, the direction of the bend, caused by the tilts of lenses and the like, of a laser beam propagating along the optical path in which the second mirror 35 is omitted (the number of mirrors is an even value) becomes opposite to that of the bend, caused by the tilts of lenses and the like, of other laser beams (their optical paths include even numbers of mirrors), thus causing color misregistration that is a serious problem upon reproducing a predetermined color.

When a predetermined color is reproduced by superposing 10 (=2+2+2+4) laser beams LY, LM, LC, and LB, the numbers of mirrors inserted in the optical paths of the laser beams LY, LM, LC, and LB in the post-deflection optical system 30 are substantially standardized to be odd or even values.

FIGS. 9A and 9B show the relationship among the distance, $L_1$, between the optical axis of the system of the post-deflection optical system and a scanning line on one end, the distance, $L_M$, between the optical axis of the system of the post-deflection optical system and a scanning line on the other end, and the distance, $\Delta L_{MAX}$, in a direction parallel to the optical axis of the system, between the end scanning lines.

The maximum values of these values ($L_1$, $L_M$, and $\Delta L_{MAX}$) are set in accordance with the distance, $L_0$, between the final lens surface and the image surface, and the intervals between adjacent beams indicated by M=4 groups. However, if the maximum values are set preferentially based on the distance $L_0$ between the final lens surface and the image surface, requirements on the optical system become stricter, and variations in various characteristics, e.g., imaging characteristics, bend of scanning lines, and the like due to environmental changes may reach levels that cannot be ignored.

In view of this problem, as a result of repetition of designing many light scanning units and mounting optical members, conditions that can maintain high optical performance of the light scanning unit and can assure required intervals between adjacent photosensitive drums and required distances between the light scanning unit and the photosensitive drums were confirmed. That is, high optical performance of the light scanning unit can be maintained and required intervals between adjacent photosensitive drums and required distances between the light scanning unit and the photosensitive drums can be assured under the conditions that the following relations hold among the above-mentioned distances $L_1$, $L_M$, and $\Delta L_{MAX}$:

$$(\Delta L_{MAX} + L_M + L_1)/1.8 > L_0$$

$$L_0 > (\Delta L_{MAX} + L_M + L_1)/2$$

More specifically, a laser beam passing through the final lens (the second image-forming lens 30b) can be approximated to the one that is output in a direction parallel to a line connecting the optical axes of the two lenses 30a and 30b of the post-deflection optical system 30, as shown in FIGS. 10A and 10B.

On the other hand, reflections of a beam separated at a position closest to the lens side by the first and second mirrors are approximated by a single reflection, and let (x, y)=(0, 0) be this reflection point. In addition, the photosensitive drum is assumed to be located on the side above the optical axis (i.e., above the plane of the drawing of FIGS. 10A and 10B) (hence, the coordinate system used here is different from those of other drawings).

Furthermore, let $(x_1, y_1)$ be the reflection point by the third mirror, $(x_2, y_2)$ be the coordinate position of the image surface, and $(x_3, y_3)$ be the coordinate position of the image surface of the beam which passes through only one mirror.

Then, in order to maximize the mountable volume of process-related members, if $y_1$ is positive, an area $S_1$ bounded by $(x_3, y_3)$, $(x_2, y_2)$, $(x_1, y_1)$, and $(x_3, y_1)$ need only be maximized, as shown in FIG. 10A. On the other hand, if $y_1$ is negative, an area $S_2$ bounded by $(x_3, y_3)$, $(x_2, y_2)$, $(x_1, 0)$, and $(x_3, 0)$ need only be maximized.

Let $\psi$ be the angle the beam reflected by the second mirror and the optical axis of the post-deflection optical system make, and $L_1$ be the distance between the reflection points by the second and third mirrors. Then, in order to maximize the area $S_1$ or $S_2$, $y_1$ and $x_1$ are respectively described by:

$$y_1 = L_1 * \text{Sin}[\psi] \qquad (a-1)$$

$$x_1 = L_1 * \text{Cos}[\psi] \qquad (a-2)$$

where * is the complex conjugate number.

Let $L_2$ be the optical path length from the reflection point by the second mirror to the image surface, and $(x_2, y_2)$ be the coordinate position of the image surface by approximating that the beam reflected by the third mirror propagates in a direction perpendicular to the optical axis of the post-deflection optical system (in such case, $S_1$ or $S_2$ is maximized). Then, we have:

$$x_2 = x_1 \qquad (a-3)$$

$$y_2 = y_1 + L_2 - L_1 \qquad (a-4)$$

On the other hand, let $y_4$ be the distance between a beam separated at a position closest to the lens side and a beam separated finally by the first mirror. Then, the following relations hold:

$$x_3 = -(L_2 - y_4 - y_2) \qquad (a-5)$$

$$y_3 = y_2 \qquad (a-6)$$

Therefore, $S_1$ and $S_2$ are respectively given by:

$$S_1 = (y_2 - y_1) \cdot (x_2 - x_3) \tag{a-7}$$

$$S_2 = y_2(x_2 - x_3) \tag{a-8}$$

Since $y_4$ is set to be a distance that allows three beams to separate at positions where the beams do not overlap each other, when the separation points are located at equal intervals with respect to the image surfaces of the respective beams, the optical path lengths from the image surfaces and the corresponding separation points are respectively given by $L_2$, $(L_2-(x_2-x_3)/3/2)$, and $2(L_2-(x_2-X_3)/3/2)$. on the other hand, if $\omega_0$ represents the beam radius on the image surface, the convergence angle of the beam is expressed by $\lambda/(\pi\omega)$. Hence, if $\xi$ represents a coefficient including the influence of diffraction by the stops of the pre-deflection optical system, $y_4$ is defined by:

$$y_4 = \xi 2\lambda/\pi/\omega_0(L_2 + (L_2-(x_2-x_3)/3/2) + 2(L_2-(x_2-x_3)/3/2)) \tag{a-9}$$

Note that $\zeta$ is normally set to be 1.4 to obtain the beam size w on the image surface. On the other hand, $\zeta$ is defined to be about 2.8 to remove the influence of diffraction of neighboring beams in association with, especially, the first mirror (separation mirror).

Solving formula (a-9) for $y_4$ yields:

$$y_4 = -((\xi L_1\lambda - 6\xi L_2\lambda + \xi L_1\lambda \cos[\psi] - \xi L_1\lambda \sin[\psi])/(-(\xi\lambda)+\pi\omega_0))(a-10)$$

Note that data shown in FIG. 11 is obtained by substituting formula (a-10) and formulas (a-1) to (a-6) in formulas (a-7) and (a-8), and plotting the smaller one of the values $S_1$ and $S_2$ on the ordinate. In FIG. 11, under the conditions of $\xi=1.4$, $L_2=175$, $\lambda=0.00068$, and $\omega_0=0.025$, the abscissa plots $\psi$ within the range from $-\pi$ to $\pi$, and the axis in the direction of depth plots $L_1$ within the range from 0 to 175.

As can be seen from FIG. 11, a condition that the smaller one of the values $S_1$ and $S_2$ is maximized is:

$$\psi = 0 \tag{a-11}$$

Calculating a solution which yields 0 by differentiating $S_1$ by $L_1$, we have:

$$L_1 = -(6\xi L_2 + \pi L_2\omega_0 + \pi L_2\omega_0 \cos[\psi] - \pi L_2\omega_0 \sin[\psi])/(-2\pi\omega_0 - 2\pi\omega_0 \cos[\psi] + 2\pi\omega_0 \sin[\psi])) \tag{a-12}$$

In practice, the numerical value obtained by adding the distance between the final lens surface and the first mirror to $L_2$ is $L_0$. However, assuming $L_2 = L_0$ by approximation, we can rewrite the solution as:

$$(\Delta L_{MAX} + L_M + L_1)/L_0 \approx ((2_{y2} + x_1 - x_3)/L_2 \tag{a-13}$$

Therefore, substitution of formula (a-11) into formula (a-13) yields:

$$(\Delta L_{MAX} + L_M + L_1)/L_0 \approx ((\xi\lambda - 2\pi\omega_0)(3\xi\lambda - \pi\omega_0))/(\pi\omega_0(-(\xi\lambda)+\pi\omega_0)) \tag{a-14}$$

FIG. 12 shows the value of formula (a-14) while the abscissa plots within the range from 1.4142 to 2.8 and the axis in the depth direction plots $\omega_0$ within the range from 0.02 to 0.06 with respect to $\lambda=0.00063$ as a currently practical combination of the ranges. Similarly, FIG. 13 shows the value of formula (a-14) while the abscissa plots $\xi$ within the range from 1.4142 to 2.8 and the axis in the depth direction plots $\omega_0$ within the range from 0.02 to 0.06 with respect to $\lambda=0.0008$.

It is seen from FIGS. 12 and 13 that high optical performance of the light scanning unit can be maintained and prescribed intervals between adjacent photosensitive drums and prescribed distances between the light scanning unit and the photosensitive drums can be assured, i.e., the mountable volume of process-related members is maximized with respect to $S_1$, under the conditions that the following relations hold:

$$(\Delta L_{MAX} + L_M + L_1)/1.8 > L_0$$

$$L_0 > (\Delta L_{MAX} + L_M + L_1)/2$$

In the above description, the intervals between adjacent photosensitive drums are assumed to be constant. For example, when the diameter of the photosensitive drum to which a beam to be returned only once is guided is larger than that of other photosensitive drums by $\Delta D$, the transfer positions can be maintained at predetermined heights by decreasing $L_M$ by $\Delta D$ and increasing $\Delta L_{MAX}$ by $\Delta D$.

For this reason, the value $(\Delta L_{MAX} + L_M + L_1)$ remains the same even when the diameters of the photosensitive drums are not uniform. Therefore, formula (a-15) is also effective for an image forming apparatus in which one of the intervals between adjacent photosensitive drums and the diameters of the photosensitive drums is nonuniformly set.

In order to verify these conditions, when the above-mentioned conditions are applied to the light scanning unit shown in FIGS. 2 to 9B, and FIGS. 14A to 16, since:

$$(\Delta L_{MAX} + L_M + L_1)/1.8 = 187.25 \text{ mm}$$

$$L_0 = 175 \text{ mm}$$

$$(\Delta L_{MAX} + L_M + L_1)/2 = 168.527$$

it is apparent that the above-mentioned conditions are satisfied.

Therefore, the size of the entire post-deflection optical system and the lenses used therein can be appropriately selected, and the differences in curvature generation amount of the M beam groups due to environmental changes can be suppressed. At the same time, the size of the light scanning unit can be prevented from becoming undesirably large. Since the field angle can be increased as compared to a light scanning unit having nearly an equal size, a lower image frequency can be set.

Figure 14A:
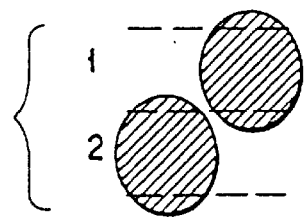
FIGS. 14A and 14B are schematic views illustrating the positional relationship which laser beams on the image surface have when the scanning unit shown in FIG. 2 is used.
Figure 14B:
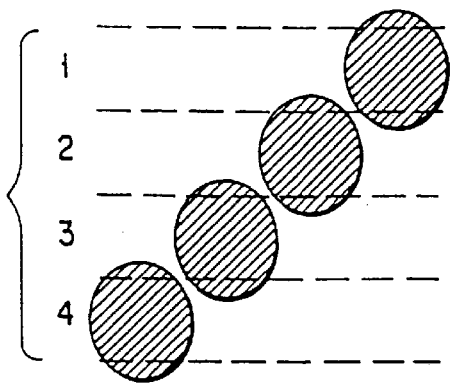

FIGS. 14A and 14B are schematic views showing the positional relationship of the laser beams guided to the image surface.

FIG. 14A shows the laser beams LM and LC each of which is obtained by synthesizing two laser beams, and FIG. 14B shows an example of the laser beam LB obtained by synthesizing four laser beams. In FIGS. 14A and 14B, the hatched portion corresponds to a region where the light intensity of the laser beam becomes equal to or higher than $1/e^2$. Note that the sectional shape of the beam is set so that the $1/e^2$ diameter in the main scanning direction becomes about 0.8 to 1.2 times the distance (pitch) between adjacent beams, and the $1/e^2$ diameter in the sub-scanning direction becomes about 1.2 to 1.6 times the pitch. The adjacent beams (four beams for LB) are set to scan adjacent scanning lines on the image surface and are offset in the scanning direction by the $1/e^2$ diameter or more to prevent the $1/e^2$ diameters from overlapping each other.

More specifically, when an image is exposed using a laser beam obtained by synthesizing two or more laser beams, if the $1/e^2$ diameters of the laser beams in which the light intensities of the respective laser beams become $1/e^2$ or higher overlap each other, the beam shape may change due to interference between the beams. However, as shown in FIGS. 14A and 14B, by slightly shifting the beam intervals and the positions in the scanning direction, changes in beam shape due to interference between the beams can be prevented.

Figure 15:
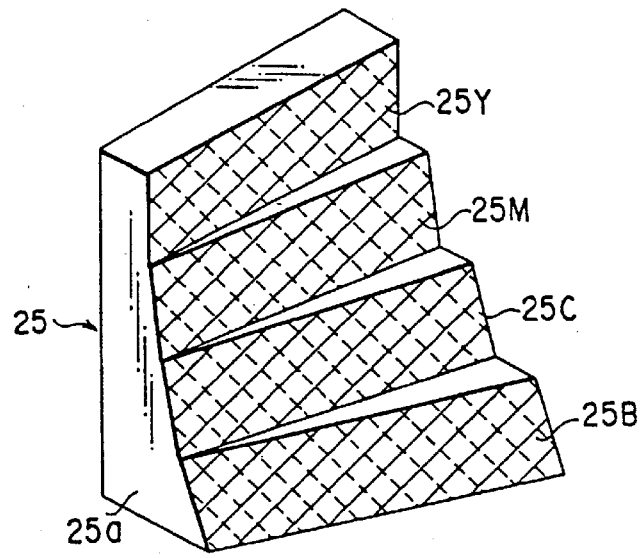
FIG. 15 is a schematic perspective view of a mirror for horizontal synchronization detection in the light scanning unit shown in FIG. 2.

FIG. 15 shows in detail the horizontal synchronization mirror.

Referring to FIG. 15, the horizontal synchronization mirror 25 has first to fourth mirror surfaces 25Y, 25M, 25C, and 25B which are formed to have different angles in both the main scanning and sub-scanning directions and a mirror block 25a for integrally holding these mirror surfaces 25(Y, M, C, and B), so as to reflect the synthesized laser beams LY, LM, LC, and LB toward the horizontal synchronization detector 23 at different timings in the main scanning direction, and to provide substantially the same heights on the horizontal synchronization detector 23 in the sub-scanning direction.

The mirror block 25a is formed using, e.g., glass-containing PC (polycarbonate). On the other hand, the mirrors 25(Y, M, C, and B) are formed by depositing a metal such as aluminum at corresponding positions of the block 25a formed at predetermined angles.

With this arrangement, the laser beams LY, LM, LC, and LB deflected by the light deflection unit 5 can be incident at identical detection positions on the single detector 23. Also, for example, when a plurality of detectors are arranged, horizontal synchronization signals can be prevented from being shifted due to variations in sensitivity or the position deviations of the detectors. Note that the horizontal synchronization detector 23 receives the laser beam groups LY, LM, LC, and LB a total of four times per line in the main scanning direction, and can obtain horizontal synchronization signals $N_i$ times (twice for each of LY, LM, and LC, and four times for LB) for each beam, needless to say. Also, the mirror block 25a can be separated from the mold without requiring any undercut since the mirror surfaces of the mold are integrally designed to be formed by grinding a block.

Figure 16:
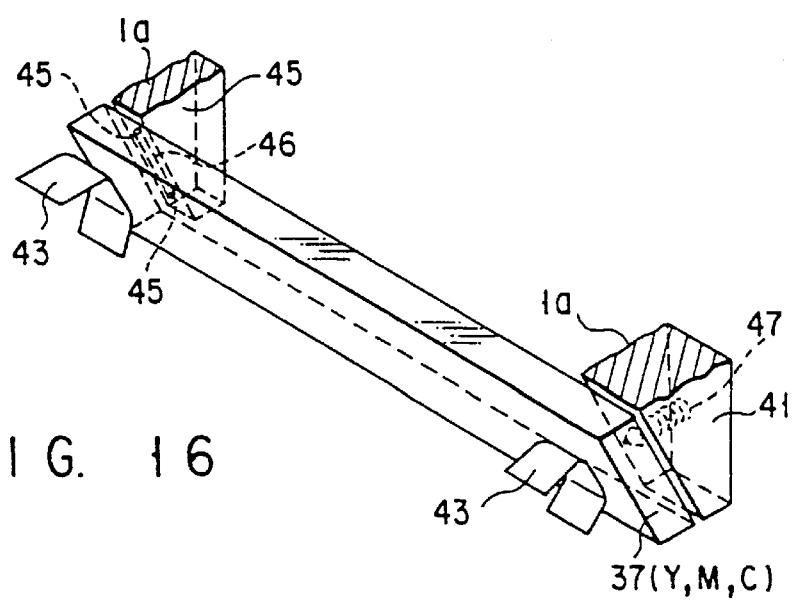
FIG. 16 is a schematic perspective view showing the adjustment mechanism of an exit mirror in the light scanning unit shown FIG. 2.

FIG. 16 is a schematic-perspective view showing the support mechanism of the third mirrors 37Y, 37M, and 37C.

Referring to FIG. 16, the third mirrors 37(Y, M, and C) are held at predetermined positions of the intermediate base 1a of the light scanning unit 1 by fixing portions 41(Y, M, and C) formed integrally with the intermediate base 1a and mirror press leaf springs 43(Y, M, and C) which respectively oppose the fixing portions 41(Y, M, and C) to sandwich the corresponding mirrors therebetween.

A pair of fixing portions 41(Y, M, or C) are formed on two end portions of each mirror 37(Y, M, or C).

Two projections 45(Y, M, or C) for holding the mirror 37(Y, M, or C) at two points are formed on one fixing portion 41(Y, M, or C). A set screw 47 for movably supporting the mirror held by the projections 45(Y, M, or C) in the vertical direction or along the optical axis is arranged on the other fixing portion 41(Y, M, or C).

As shown in FIG. 16, since the mirrors 37(Y, M, and C) move in the direction perpendicular to the mirror surface or in the optical axis direction to have the projections 45(Y, M, and C) as fulcrums when their set screws 47(Y, M, and C) move in a predetermined direction, the tilt in the main scanning direction, i.e., the bend is corrected.

Figure 17A:
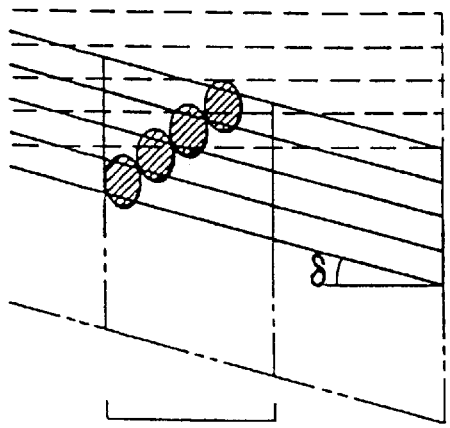
FIGS. 17A to 17C are schematic views showing the beam positions of laser beams irradiated onto the photosensitive drum by the light scanning unit.
Figure 17B:
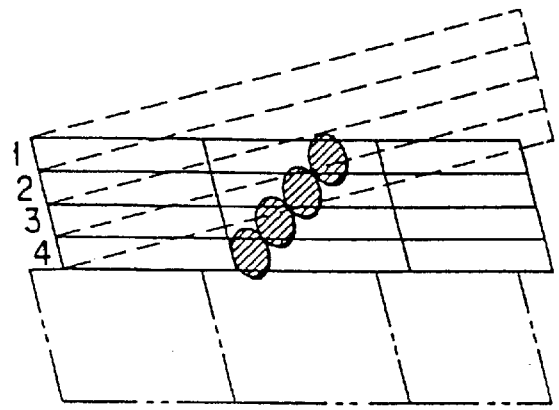
Figure 17C:
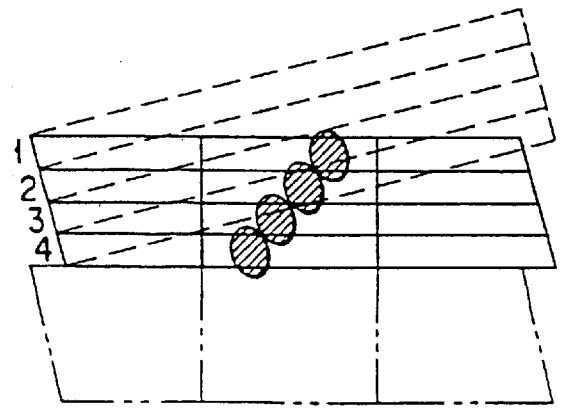

FIGS. 17A to 17C are schematic views showing the exposure state of the laser beams on the image surface, i.e., the state wherein a latent image is formed on the photosensitive drum. Note that a description with reference to FIGS. 17A to 17C will be made while taking as an example black laser beams, i.e., the four laser beams emitted by the light source 3B.

Referring to FIGS. 17A to 17C, regions indicated by solid lines correspond to those subjected to image generation by a certain reflection surface of the polygonal mirror main body 5a of the light deflection unit 5 (i.e., regions that deflect laser beams for image formation), and the central region corresponds to the effective image region. Other regions correspond to non-effective regions for deflecting laser beams which do not contribute to any image generation. Note that portions indicated by alternate long and short dashed lines correspond to regions subjected to image generation by the next reflection surface of the polygonal mirror main body 5a.

FIG. 17A shows the angle the scanning line and the rotation direction of the photosensitive drum make, i.e., the tilt amount, k, of the scanning line with respect to the sub-scanning direction, if p represents the inter-beam distance (beam pitch) and k represents the number of reflection surfaces of the polygonal mirror main body 5a, when (N−4) laser beams deflected by a certain reflection surface of the polygonal mirror main body 5a of the light deflection unit 5 are imaged to scan a predetermined image surface at an equal speed.

Note that the tilt δ is obtained by:

$$\delta = \tan^{-1}[(N \times p \times k \times \phi)/(4 \times \pi \times W)]$$

where N is the number of laser beams, φ is the effective field angle, and W is the effective image region width. The tilt δ lags (−) with respect to the rotation direction of the photosensitive drum.

FIG. 17B shows an example of correcting the tilt δ obtained by FIG. 17A, i.e., illustrates that the scanning line becomes parallel to the rotation direction of the photosensitive drum (i.e., the scanning line becomes parallel to the axis of the photosensitive drum) by setting a certain tilt δ between the scanning line and the rotation direction of the photosensitive drum, i.e., the sub-scanning direction. In this case, the tilt δ matches the angle shown in FIG. 17A. Note that the tilt δ leads (+) with respect to the rotation direction of the photosensitive drum, needless to say. Also, the tilt δ is given to the entire light scanning unit or at least all the optical members participating in guiding laser beams reflected by the light deflection unit toward the photosensitive drums (when the light scanning unit 1 is arranged in the image forming apparatus 100, the axes connecting the light deflection unit 5 and the photosensitive drums 58(Y, M, C, and B) tilt by δ with respect to those of the photosensitive drums 58). In order to set an optimal tilt angle $\delta_i$ with respect to the respective beam groups, the respective beam groups can be tilted by $\delta_i-\delta$ with respect to the mirrors 35 and 37 in the main scanning direction.

FIG. 17C shows the write start positions by the four beams of the scanning lines corrected to become parallel to the rotation direction of the photosensitive drum by the method shown in FIG. 17B. As shown in FIG. 17C, the write start positions can be improved to be perpendicular to the rotation direction of the photosensitive drum by tilting the horizontal synchronization reference positions of the four laser beam through the angle δ with respect to the scanning lines.

Let v be the process speed (mm/s) and Np be the rotational speed (rpm) of the rotary polygonal mirror main body 5a of the light deflection unit 5. Then, the moving distance of the surface of the photosensitive drum during the exposure time of the laser beam by one reflection surface of the rotary polygonal mirror main body 5a is 60 v/(NpN)=Q (mm). More specifically, Q is a function of the process speed, and the tilt δ of the scanning line is described as follows:

$$\delta = \tan^{-1}[(N_i \times p \times k \times \phi)/(4 \times \pi \times W)]$$
$$= \tan^{-1}(N_i \times 60v\phi/(4\pi W N p))$$
$$= \tan^{-1}(15 N_i v(\phi/\pi W N p))$$

and is a function of the process speed.

As described above, when each of M groups of laser beams includes N beams, the entire light scanning unit or all the optical members taking part in guiding the laser beam reflected by the light deflection unit toward the photosensitive drums is or are tilted in the direction opposite to the tilt generated upon guiding $N_i$ beams toward the photosensitive drums, thereby correcting the tilt of the scanning line. With this correction, even when the number N of beams per group is increased, the horizontal line of the output image can be prevented from tilting.

The phase difference among $N_i$ laser beams will be explained below with reference to FIGS. 18A and 18B to FIG. 22. In the following description, a case of two beams will be exemplified, but the same applies to three or more beams.

FIG. 18A shows the intensity distribution when the phase difference between neighboring beams is in, and FIG. 18I shows the intensity distribution when the phase difference is 180°. In the following description, let $\beta p$ be the $e^{-2}$ diameter in the main scanning direction of the beam (p is the beam pitch), $\alpha p$ be the $e^{-2}$ diameter in the sub-scanning direction of the beam, $\zeta$ be the half exposure amount of each photosensitive drum/average exposure energy, and η be the intensity of one beam relative to the peak intensity of the other beam at the middle point of a line connecting the centers of two neighboring beams. Also, in the following description, α=1.2, β=0.8, ζ=0.25, η=0.211, and p=0.042 mm. Note that the above-mentioned conditions indicate that the beam central position is shifted by 0.042 mm in the sub-scanning direction and by 0.0096 mm in the main scanning direction.

As can be seen from FIGS. 18A and 18B, when $N^i$ laser elements of a light source having $N_i$ beams per group simultaneously emit $N_i$ laser beams, the intensity distribution of the laser beams that reach the photosensitive drums changes as a result of the influence of interference due to the phase difference. More specifically, as shown in FIG. 18A, if the phase difference is 0°, the intensity distribution between the two beams increases to enhance the exposure amount; if the phase difference is 180°. (FIG. 18B), the valley of the intensity distribution is formed between the two beams.

Figure 19A:
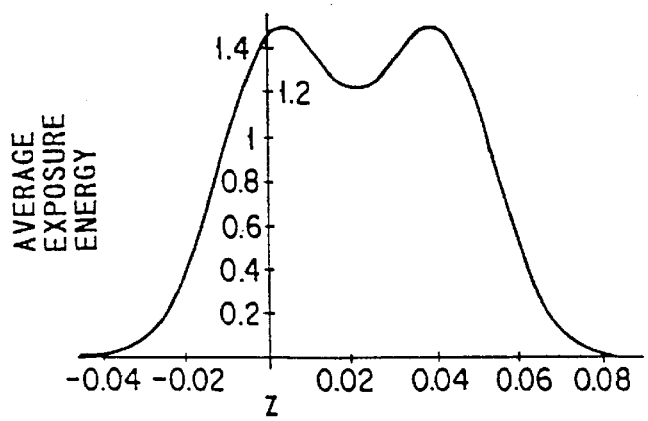
FIGS. 19B and 19B are graphs showing the normalization results of the intensity distributions shown in FIGS. 18A and 18B by average exposure energy.
Figure 19B:
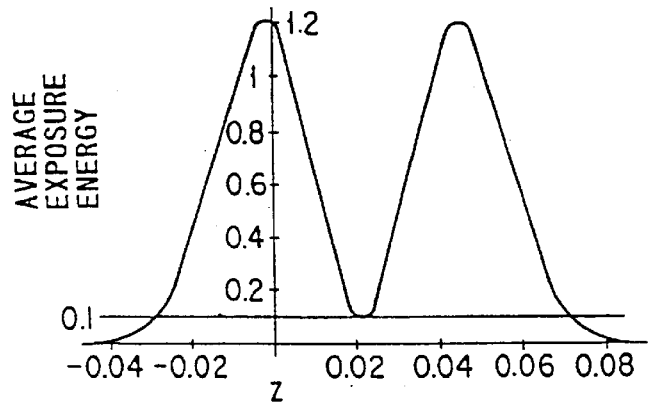

FIGS. 19A and 19B are graphs obtained by normalizing the intensity distributions on the photosensitive drum shown in FIGS. 18A and 18B by the average exposure energy, i.e., obtained by dividing the integration result, in the y-direction, of the intensity distribution for only one beam by p. Note that FIG. 19A corresponds to the phase difference=0° and FIG. 19B corresponds to the phase difference 180° as in FIGS. 18A and 18B.

FIG. 19A reveals that a light intensity larger than 0.25 indicating the half decay amount which shows an amount of energy necessary for decreasing by 50% the charge applied to the photosensitive drum 58 by charger 60 (in this graph, since the average exposure energy is unity, half decay amount=half decay amount/average exposure energy× average exposure energy=ζ×average exposure energy) can be assured.

In contrast to this, FIG. 19B indicates that a light intensity that satisfies the half exposure amount cannot be obtained in the valley of the intensity distribution.

This means that even a non-exposed portion is developed as a latent image in the valley of the intensity distribution formed when the phase difference between the two beams is 180° in the case of normal development contrary to the central portions of the respective beams. On the other hand, in the case of reversal development, even an exposed portion is not developed, i.e., image omission occurs. Note that the phase difference between the two beams varies as time passes if the wavelengths of the laser beams emitted by the laser elements are not quite perfectly the same.

Figure 20A:
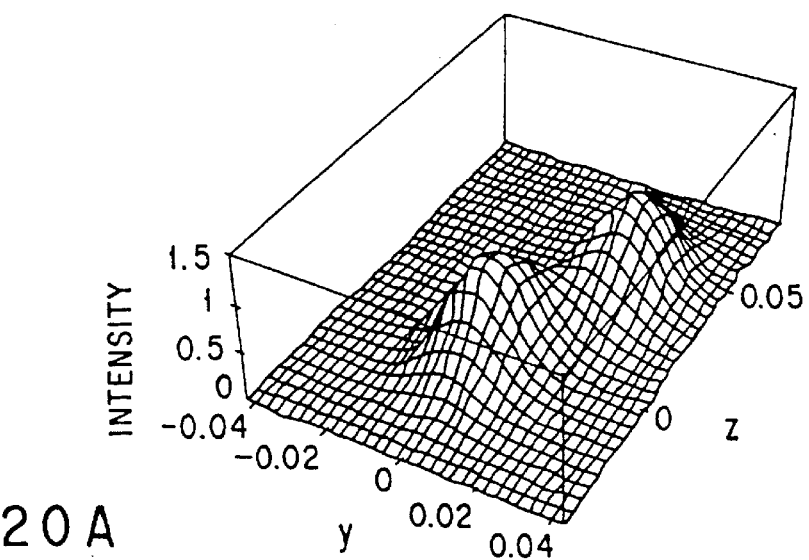
FIGS. 20A and 20B are graphs showing the relationship between the phase difference and the intensity distribution of laser beams irradiated onto the photosensitive drum by the light scanning unit shown in the respective drawings under the same conditions as in FIGS. 18A and 18B.
Figure 20B:
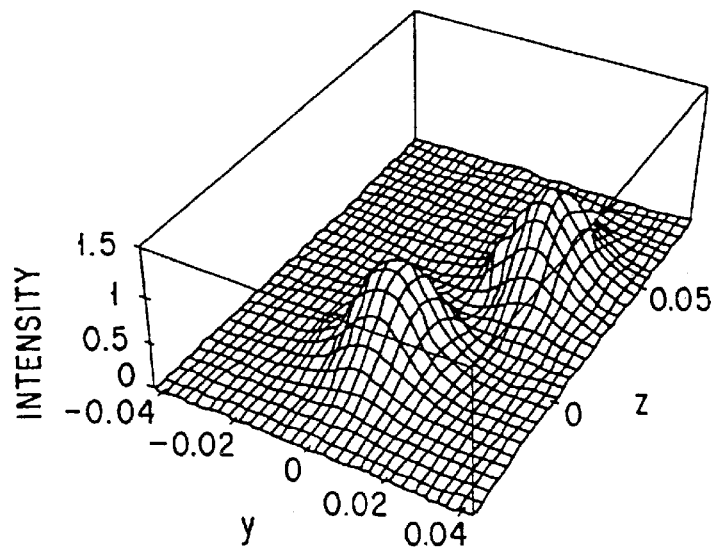

FIGS. 20A and 20B show the calculation results of the intensity distributions as in FIGS. 18A and 1BB for a certain group of laser beams (two beams) of the light scanning unit 1 shown in FIGS. 2 to 12 according to the embodiment of the present invention. Assume that α, β, ζ, η, and p are respectively set to be α=1.2, α=0.8, ζ=0.25, η=0.135, and p=0.042 mm. Note that the above-mentioned conditions indicate that the beam central position is shifted by 0.042 mm in the sub-scanning direction and by 0.0187 mm in the main scanning direction. The phase differences in FIGS. 20A and 20B are respectively 0° and 180°.

As is apparent from FIGS. 20A and 20B, if the phase difference is 0° (FIG. 20A), the intensity distribution between the two beams increases to enhance the exposure amount; if the phase difference is 180° (FIG. 20B), the valley of the intensity distribution is formed between the two beams.

Figure 21A:
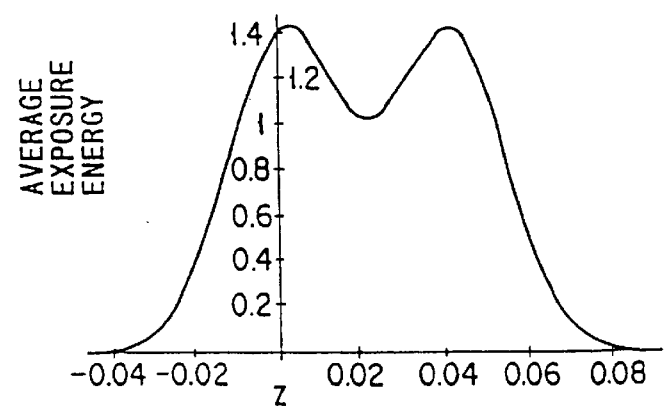
FIGS. 21A and 21B are graphs showing the normalization results of the intensity distributions shown in FIGS. 20A and 20B by average exposure energy using the same method as in FIGS. 19A and 19B.
Figure 21B:
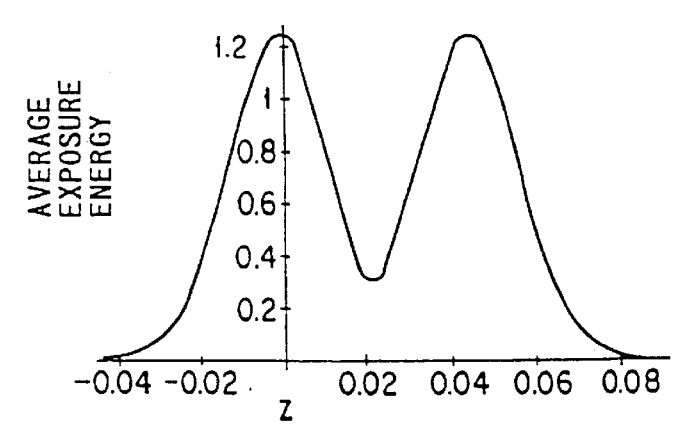

FIGS. 21A and 21B show the normalization results of the intensity distributions shown in FIGS. 20A and 20B by the average exposure energy as in FIGS. 18A and 18B. Note that FIG. 21A corresponds to the phase difference=0° and FIG. 21B corresponds to the phase difference=180° as in FIGS. 18A and 18B.

As can be seen from FIGS. 21A and 21B, in the light scanning unit shown in FIGS. 2 to 9B according to the embodiment of the present invention, a light intensity larger than 0.25 indicating the normalized half exposure amount can be assured independently of the phase difference (0° or 180°) between the neighboring beams.

A condition that can provide a light intensity larger than the half exposure amount of the photosensitive drum even when the phase difference between the two beams is 180° will be explained below.

As has already been described above, when p represents the beam interval in the sub-scanning direction, $\beta p$ represents the $e^{-2}$ diameter, in the main scanning direction, of the beam, $\alpha p$ represents the $e^{-2}$ diameter, in the sub-scanning direction, of the beam, ζ represents the half exposure-amount of the photosensitive body/average exposure energy, and η represents the intensity of one beam relative to the peak intensity of the other beam at the middle point of a line connecting the centers of two neighboring beams, it is assumed that z represents the sub-scanning direction, y represents the main scanning direction, one beam is located at a coordinate position (y, z)=(0, 0), and the other beam is located at a coordinate position (y, z)=(δy, p).

Then, the relative intensity η at the middle point of the line connecting the centers of the two neighboring beams is given by:

$$\eta = \exp^{-\chi}$$

(c-1)

At this time, $\chi$ is described by:

$$\chi = \frac{\left(\frac{p}{2}\right)^2}{r_z^2} + \frac{\left(\frac{\delta y}{2}\right)^2}{r_y^2} \tag{c-2}$$

In contrast to this, $\delta y$ that gives the relative intensity $\eta$ at the middle point of the line connecting the centers of the two neighboring beams is calculated by solving formulas (c-1) and (c-2) for $\delta y$:

$$\delta y = r y \sqrt{4x - \frac{p^2}{r_z^2}} \tag{c-3}$$

for $\chi = -0.5 \ln(\eta)$

Therefore, the electric field distributions of the beams, each of which has the $e^{-2}$ diameter of $\beta p$ in the main scanning direction and the $e^{-2}$ diameter of $\alpha p$ in the sub-scanning direction, and which have peak intensities at the coordinate positions $(y, z)=(0, 0)$ and $(\delta y, p)$ are respectively defined by:

$$e_1 = \exp\left(-\frac{z^2}{r_z^2} - \frac{y^2}{r_y^2}\right) \tag{c-4}$$

$$e_2 = \exp\left(-\frac{(z-p)^2}{r_z^2} - \frac{(y-\delta y)^2}{r_y^2}\right) \tag{c-5}$$

Note that $r_z$ and $r_y$ in formulas (c-4) and (c-5) are respectively given by:

$$r_z = \alpha p/2 \tag{c-6}$$

$$r_y = \beta p/2 \tag{c-7}$$

Subsequently, the average intensity required for normalizing the intensity distribution is calculated.

When formula (c-5) is integrated in the main scanning direction, i.e., the y-direction, we have:

$$i_3 = \int_{-\infty}^{+\infty} e_1 e_1^* dy = \frac{\sqrt{\pi}\beta p}{2\sqrt{\pi}\exp\left(\frac{8z^2}{\alpha^2 p^2}\right)} \tag{c-8}$$

where * is the complex conjugate number.

Thereafter, formula (c-8) is integrated in the sub-scanning direction, i.e., in the z-direction, and the integration result is divided by beam pitch p to obtain the average intensity:

$$i_{30} = \frac{\int_{-\infty}^{+\infty} i_3 dz}{p} = \frac{\pi\alpha\beta p}{8} \tag{c-9}$$

When both the first and second lasers are turned on, the energy received at a certain location is proportional to a value obtained by integrating the intensity in the main scanning direction, i.e., the y-direction since the beams are scanned in the main scanning direction.

At this time, if energy larger than the half exposure amount of the photosensitive drum is applied at a specific location corresponding to the smallest energy, image omission or toner supply to a non-exposed portion can be prevented even when the phase difference between the laser beams from the two lasers is 180°. Since the position of the location corresponding to the smallest energy is a coordinate position, in the z-direction, of the middle point of the line connecting the centers of two neighboring beams, it can be calculated by:

$$z = p/2 \tag{c-10}$$

The electric field at the location calculated by formula (c-10) is given by $e_1$–c2. Note that the value obtained by normalizing the integral of the light intensity in the main scanning direction, i.e., the y-direction by the average exposure energy is given by:

$$i_2 = \int_{-\infty}^{+\infty} \frac{(e_1 - e_2)^2}{i_{30}} dy = \frac{8 - 8\exp\left(\frac{2}{\alpha^2}\right)\eta}{\sqrt{2\pi}\,\alpha\exp\left(\frac{2}{\alpha^2}\right)} \tag{c-11}$$

In formula (c-11), since $e_1 - e_2$ is a real number from formulas (c-4) and (c-5), it can be approximated by $(e_1-e_2)*\times(e_1-e_2)=(e_1-e_2)2$.

The numerical value given by formula (c-11) becomes larger than the half exposure amount of the photosensitive drum/average exposure energy, as described by:

$$i_2 \geq \zeta \tag{c-12}$$

Substitution of formula (c-11) into formula (c-12) obtained in this manner yields:

$$\eta < e^{-\frac{2}{\alpha^2}} - \frac{\sqrt{2\pi}}{8}\alpha\zeta \tag{c-13}$$

Therefore, by setting 7 to satisfy formula (c-13), the phase difference between neighboring laser beams need not be taken into consideration upon using a group of laser beams obtained by synthesizing two or more laser beams.

In the light scanning device shown in FIGS. 2 to 12 according to the embodiment of the present invention, $\eta<0.155354$ is derived from formula (c-13).

In the examples shown in FIGS. 20A, 20B, 21A, and 21B, $\eta=0.135$, while in the examples shown in FIGS. 18A, 18B, 19A, and 19B, $\eta=0.211$. Therefore, it is confirmed that formula (c-13) is effective.

Figure 22:
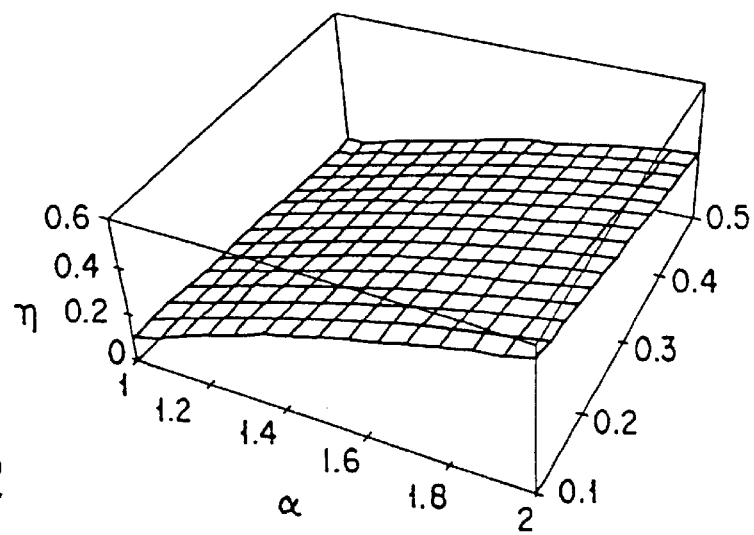
FIG. 22 is a graph showing a setting example of elements of the light scanning unit that can remove the influence of the phase difference between neighboring laser beams upon using a group of laser beams combining at least two laser beams.
Figure 23:
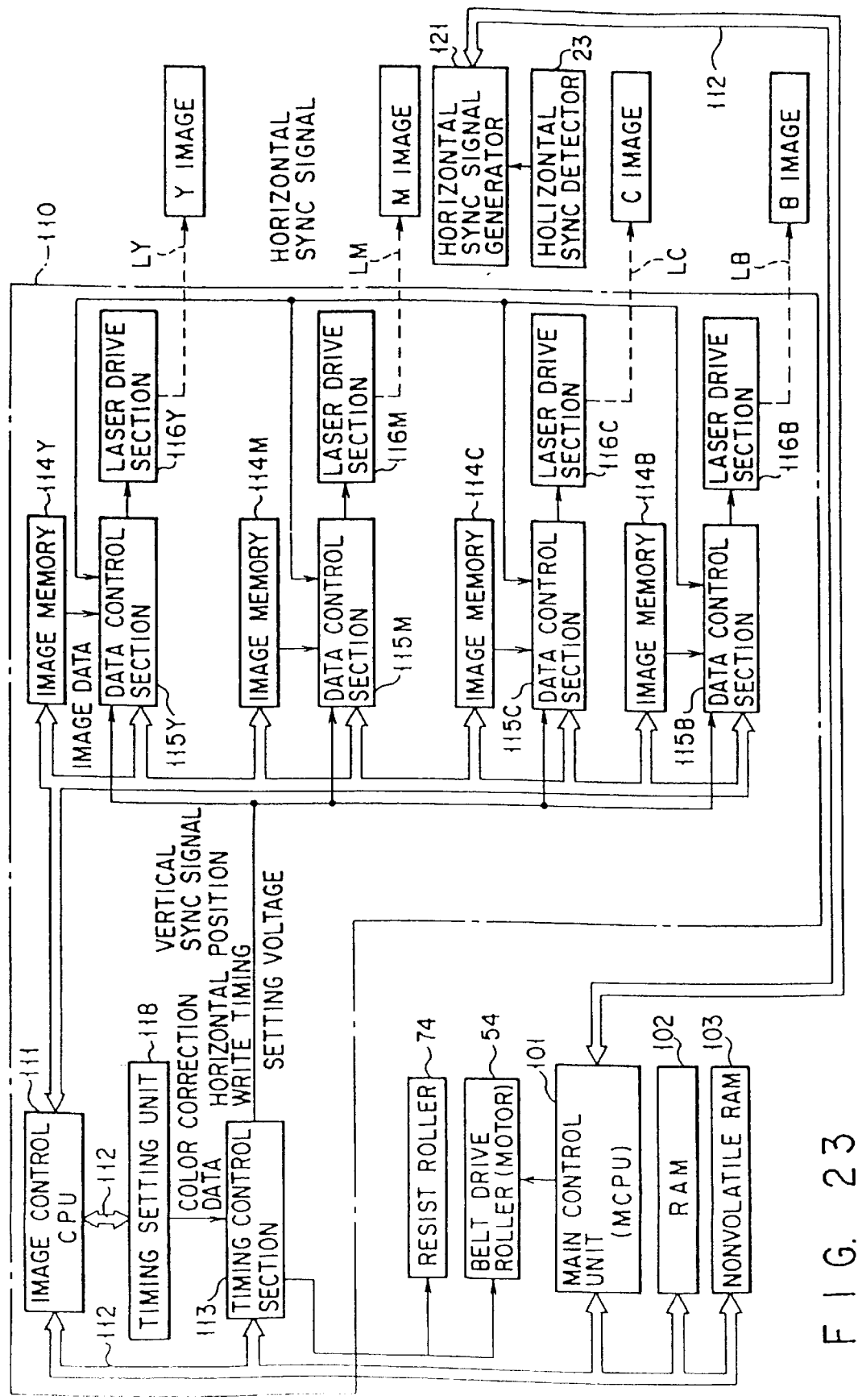
FIG. 23 is a block diagram of a control unit of the image forming apparatus shown in FIG. 1.

FIG. 22 is a graph showing the value range that n as a limit value can assume with respect to some normally used values of $\alpha$ and $\zeta$. More specifically, when the respective elements of the light scanning unit are set so that $\eta$ falls with the range below the hatched region in FIG. 22, the phase difference between neighboring laser beams need no longer be considered.

The operation of the image forming apparatus 100 will be described below with reference to FIGS. 1 to 23.

When an image formation start signal is supplied from an operation panel or host computer (not shown), the image forming units 50(Y, M, C, and B) start a warm-up operation under the control of a main control unit 101, and the polygonal mirror main body 5*a* of the light deflection unit 5 in the light scanning unit 1 is rotated at a predetermined rotational speed under the control of an image control CPU 111.

Subsequently, a RAM 102 receives image data to be printed supplied from an external storage device, the host computer, or a scanner (image reading device) under the control of the main control unit 101. Some or all data of the image data stored in the RAM 102 are stored in image memories 114(Y, M, C, and B) under the control of the image control CPU 111 in an image control unit 110.

Under the control of the main control unit 101, the pick-up roller 72 is biased at a predetermined timing, e.g., with reference to a vertical synchronization signal from a timing controller 113, to pick up one paper sheet P from the paper cassette 70. The timing of the picked-up paper sheet P is adjusted by the registration rollers 74 to Y, M, C, and B toner images provided by the image forming operations of the image forming units 50(Y, M, C, and B), and the paper sheet P is chucked on the conveyor belt 52 by the chucking roller 76. Then, the paper sheet P is guided toward the image forming units 50 upon rotation of the conveyor belt 52.

Parallel to or simultaneously with the paper feed and convey operations of the paper sheet P, laser driving units 116(Y, M, C, and B) are biased on the basis of a clock signal CLK output from a timing setting unit (clock circuit) 118, and image data DAT held in the RAM 102 is supplied to the light sources 3(Y, M, C, and B) under the control of data controllers 115(Y, M, C, and B). With this control, laser beams for one line are irradiated onto the corresponding photosensitive drums 58(Y, M, C, and B) in the image forming units 50(Y, M, C, and B) in turn from a predetermined position of the effective print width in the main scanning direction.

In order to change the intensities of the laser beams L(Y, M, C, and B) emitted by the light sources 3, image data is transferred to the laser driving units 116(Y, M, C, and B) under the control of the data controllers 115(Y, M, C, and B), thus forming images free from any deviation on the photosensitive drums 58(Y, M, C, and B) of the image forming units 50(Y, M, C, and B) in one scan of the laser beams.

The first to fourth laser beams L(Y, M, C, and B) imaged on the corresponding photosensitive drums 58(Y, M, C, and B) of the first to fourth image forming units 50(Y, M, C, and B) form electrostatic latent images corresponding to the image data on the corresponding photosensitive drums 58(Y, M, C, and B) by changing the potentials of the photosensitive drums 58(Y, M, C, and B), each of which is charged to a predetermined potential, on the basis of the image data.

The electrostatic latent images are developed by toners having corresponding colors by the developing units 62(Y, M, C, and B) and are converted into toner images.

The toner images are moved toward the paper sheet P conveyed by the conveyor belt 52 upon rotation of the corresponding photosensitive drums 58(Y, M, C, and B), and are transferred at predetermined timings onto the paper sheet P on the conveyor belt 52 by the transfer units 64.

In this manner, four color toner images which accurately overlap each other are formed on the paper sheet P. After the toner images are transferred to the paper sheet P. the residual toners on the photosensitive drums 58(Y, M, C, and B) are removed by the cleaners 66(Y, M, C, and B), and the residual potentials on the photosensitive drums 58(Y, M, C, and B) are removed by the charge removing lamps 68(Y, M, C, and B). Then, the photosensitive drums are used in the subsequent image formation.

The paper sheet P that electrostatically holds the four color toner images is conveyed upon rotation of the conveyor belt 52, and is separated from the conveyor belt 52 by the curvature of the belt driving roller 56 and the straight traveling property of the paper sheet P. Then, the paper sheet P is guided to the fixing unit 84. On the paper sheet P guided to the fixing unit 84, the respective color toners are melted by the fixing unit 84 to fix the toner images as a color image. Thereafter, the paper sheet P is exhausted onto an exhaust tray (not shown).

On the other hand, after the paper sheet P is supplied to the fixing unit 84, the conveyor belt 52 is further rotated and unwanted remaining toner on the surface is removed by the belt cleaner 82. Thereafter, the belt 52 is used for conveying the next paper sheet P fed from the cassette 70.

As described above, according to the light scanning unit of the present invention, M beam groups are incident on the reflection surface of a deflection means so that the interval between adjacent beam groups monotonously increases from one end, and a beam group on one end having the smallest interval between adjacent beam groups is incident to cross beams deflected by the deflection unit. With this arrangement, variations in imaging characteristics among beam groups and bend of scanning lines between adjacent beam groups can be eliminated. Therefore, image quality can be prevented from deteriorating. Note that the size of the light scanning unit can also be reduced.

According to the light scanning unit of the present invention, let $L_1$ be the distance between the optical axis of the system of a second optical means and a scanning line on one end, $L_M$ be the distance between the optical axis of the system of the second optical means and a scanning line on the other end, and $\Delta L_{MAX}$ be the distance, in a direction parallel to the optical axis of the system, between the end scanning lines. Then, the distance $L_0$ between the final lens surface and the image surface is set to fall within the range $(\Delta L_{MAX}+L_M+L_1)/1.8 > L_0 > (\Delta L_{MAX}+L_M L_1)/2$. In this manner, the bend of the scanning lines between adjacent beam groups can be eliminated. Note that the sizes of the lenses and light scanning unit can also be prevented from undesirably increasing.

Furthermore, according to the light scanning unit of the present invention, let $L_t$ be the distance between the reflection point on the deflection means and the image surface, and W be the effective image region width including a region where a horizontal synchronization signal is detected. Then, the effective field angle $\phi$ of a beam to be deflected by the deflection means is set within the range $\phi > W/L_t$. In this manner, deterioration of the imaging characteristics and an increase in degree of bend of scanning lines due to environmental changes can be prevented. Therefore, each lens can use a low-cost plastic lens, and the cost of the light scanning unit can be reduced.

Moreover, according to the light scanning unit of the present invention, since the incident angles and positions to M sets of optical members with positive power in only the sub-scanning direction are asymmetrically set with respect to the optical axes of the optical members, the influence of coma generated in laser beams that pass through positions separated by a certain distance from the optical axis of the system in the sub-scanning direction can be eliminated. With this arrangement, a decrease in resolution of images can be prevented.

According to the light scanning unit of the present invention, since the number of times that the beams pass through semi-transparent mirrors is 1 or 0, variations in various aberrations among beam groups generated when convergent laser beams are incident on a plane-parallel plate are hard to occur, and deterioration of image quality can be prevented.

Furthermore, according to the light scanning unit of the present invention, let p be the scanning pitch in the sub-scanning direction, and k be the number of rotary polygonal mirror surfaces. Then, since the scanning line is tilted by:

$$\delta = \tan^{-1}(N_i \times p \times k \times \phi/(4 \times \pi \times W))$$

from a direction perpendicular to the traveling direction of an image carrier, the scanning line can be prevented from tilting with respect to the axis of the photosensitive drum, i.e., the sub-scanning direction.

Moreover, according to the light scanning unit of the present invention, let p be the beam pitch in the sub-scanning direction, β be the $e^{-2}$ diameter, in the main scanning direction, of the beam/p, α be the $e^{-2}$ diameter, in the sub-scanning direction, of the beam/p, ζ be the half exposure amount of the photosensitive body/average exposure energy, and η be the intensity of one beam relative to the peak intensity of the other beam at the middle point of a line connecting the centers of two neighboring beams. Then, the following relations hold:

$$\eta < e^{-\frac{2}{\alpha^2}} - \frac{\sqrt{2\pi}}{8}\alpha\zeta$$

Therefore, image omission or toner attachment to a non-exposed portion owing to the influence of interference upon irradiating $N_i$ laser beams onto proximate positions on the image surface can be prevented. Also, since the influence of the phase difference between adjacent ones of $N_i$ laser beams need not be taken into consideration, the cost of the unit can be reduced.

According to the light scanning unit of the present invention, since M sets of optical members assigned positive power in only the sub-scanning direction are constituted by a one-sided cylinder lens consisting of glass and a double-sided cylinder lens substantially equivalent to the material of a post-deflection optical system lens, the degree of freedom in materials that can be used as a glass lens can be increased. Therefore, the cost of the light scanning unit can be reduced.

Furthermore, according to the light scanning unit of the present invention, since the number and reflectances of synthesis means for synthesizing beams passing through M lenses indicated by M=1 to M=j and located at the side close to the light sources are optimized, the outputs from the light sources for M can be set nearly equal to each other. Therefore, the cost of the laser elements, laser driving units, and synthesis means can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical exposure unit comprising:
    a light source;
    forwardly deflecting optical set including a first lens for providing a light beam from said light source with a predetermined characteristic, and a second lens for converging said light beam from said first lens in a first direction;
    a deflector for deflecting the light beam output from said second lens in a second direction perpendicular to the first direction, said deflector including a reflection surface which is formed to be rotatable about a rotation axis extending in a direction parallel to the first direction as a center of rotation; and
    an imager, including at least one lens, for imaging the light beam deflected at an equal speed by said deflector at a predetermined position,
    wherein the second lens comprises a one-sided cylinder lens formed of glass, and a double-sided cylinder lens formed of a material substantially equivalent to a material of said imager, and the double-sided cylinder lens corrects shifting of an imaging surface of the imager in the first direction, which results from variation of a refractive index of the imager which is caused by a temperature change.

2. An optical exposure unit according to claim 1, wherein the double-sided cylinder lens enables an imaging point of the double-sided cylinder lens to shift in a direction opposite to a direction where an imaging point of the imager shifts.

3. An optical exposure unit according to claim 2, wherein the imager includes a plastic cylinder lens which has negative power in the first direction, and the forwardly deflecting optical set includes a glass cylinder lens which has positive power in the first direction which is greater than an absolute value of said negative power of the plastic cylinder lens.

4. An optical exposure unit according to claim 1, wherein the imager includes a plastic cylinder lens which has negative power in the first direction, and the forwardly deflecting optical set includes a glass cylinder lens which has positive power in the first direction which is greater than an absolute value of said negative power of the plastic cylinder lens.

5. An optical exposure unit comprising:
    a light source that emits a light beam;
    a first lens configured to convert the light beam emitted by said light source into one of convergent light and collimated light;
    a second lens having lens power and configured to converge the light beam output from the first lens in only a first direction;
    a deflector that deflects the light beam output from said second lens in a second direction perpendicular to the first direction, said deflector including a reflection surface which is formed to be rotatable about a rotation axis extending in a direction parallel to the first direction as a center of rotation; and
    an imager including at least one lens and configured to form an image with the light beam deflected at an equal speed by said deflector at a predetermined position,
    wherein the second lens comprises a one-sided cylinder lens formed of glass, and a double-sided cylinder lens formed of a material substantially equivalent to a material of said imager, and the double-sided cylinder lens corrects shifting of an imaging surface of the imager in the first direction, which results from variation of a refractive index of the imager which is caused by a temperature change.

6. An optical exposure unit according to claim 5, wherein the double-sided cylinder lens enables an imaging point of the double-sided cylinder lens to shift in a direction opposite to a direction where an imaging point of the imager shifts.

7. An optical exposure unit according to claim 6, wherein the imager includes a plastic cylinder lens which has negative power in the first direction, and the second lens includes a glass cylinder lens which has positive power in the first direction which is greater than an absolute value of said negative power of the plastic cylinder lens.

8. An optical exposure unit according to claim 5, wherein the imager includes a plastic cylinder lens which has negative power in the first direction, and the second lens includes a glass cylinder lens which has positive power in the first direction which is greater than an absolute value of said negative power of the plastic cylinder lens.

* * * * *